United States Patent
Etzkorn et al.

(10) Patent No.: US 8,985,763 B1
(45) Date of Patent: Mar. 24, 2015

(54) CONTACT LENS HAVING AN UNEVEN EMBEDDED SUBSTRATE AND METHOD OF MANUFACTURE

(71) Applicants: James Etzkorn, Mountain View, CA (US); Babak Amirparviz, Mountain View, CA (US)

(72) Inventors: James Etzkorn, Mountain View, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 49 days.

(21) Appl. No.: 13/627,675

(22) Filed: Sep. 26, 2012

(51) Int. Cl.
*G02C 11/00* (2006.01)
*G02C 7/04* (2006.01)

(52) U.S. Cl.
CPC . *G02C 11/00* (2013.01); *G02C 7/04* (2013.01)
USPC ............ 351/159.03; 351/159.02; 351/159.14; 351/159.73; 351/159.74; 351/159.77

(58) Field of Classification Search
CPC ............ G02C 7/02; G02C 7/04; G02C 7/083; G02C 5/00; G02C 11/10; G02C 2202/16; B29D 12/02; A61B 3/1005
USPC ............. 351/159.02, 159.03, 159.14, 159.73, 351/159.74, 159.77
See application file for complete search history.

(56) References Cited

U.S. PATENT DOCUMENTS

| | | |
|---|---|---|
| 3,958,560 A | 5/1976 | March |
| 4,014,321 A | 3/1977 | March |
| 4,055,378 A | 10/1977 | Feneberg et al. |
| 4,122,942 A | 10/1978 | Wolfson |
| 4,136,250 A | 1/1979 | Mueller et al. |
| 4,143,949 A | 3/1979 | Chen |
| 4,153,641 A | 5/1979 | Deichert et al. |
| 4,214,014 A | 7/1980 | Hofer et al. |
| 4,309,085 A | 1/1982 | Morrison |
| 4,312,575 A | 1/1982 | Peyman et al. |

(Continued)

FOREIGN PATENT DOCUMENTS

| | | |
|---|---|---|
| EP | 0369942 | 5/1990 |
| EP | 686372 | 12/1995 |

(Continued)

OTHER PUBLICATIONS

Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.

(Continued)

*Primary Examiner* — Suchin Parihar
*Assistant Examiner* — William R Alexander
(74) *Attorney, Agent, or Firm* — McDonnell Boehnen Hulbert & Berghoff LLP

(57) ABSTRACT

Contact lenses and methods of manufacturing contact lenses are provided. In one aspect, a method includes: forming a substrate having an uneven surface; providing a sensor at a first region of the substrate; providing a chip at a second region of the substrate; and encapsulating the substrate, sensor and chip in a polymer. The method also includes: patterning interconnections from the first region of the substrate to the second region of the substrate; and patterning metal pads proximate to the second region of the substrate. The chip can be provided on a metal pad. The uneven surface can be a sloped surface or one or more sloped channels in the substrate, and the channels can be wide enough to receive interconnections for the chip and to receive the chip. Further, the substrate can be ring-shaped and curved prior to encapsulation.

11 Claims, 13 Drawing Sheets

(56) References Cited

U.S. PATENT DOCUMENTS

| | | |
|---|---|---|
| 4,401,371 A | 8/1983 | Neefe |
| 4,463,149 A | 7/1984 | Ellis |
| 4,555,372 A | 11/1985 | Kunzler et al. |
| 4,604,479 A | 8/1986 | Ellis |
| 4,632,844 A | 12/1986 | Yanagihara et al. |
| 4,686,267 A | 8/1987 | Ellis et al. |
| 4,740,533 A | 4/1988 | Su et al. |
| 4,826,936 A | 5/1989 | Ellis |
| 4,996,275 A | 2/1991 | Ellis et al. |
| 4,997,770 A | 3/1991 | Giles et al. |
| 5,032,658 A | 7/1991 | Baron et al. |
| 5,034,461 A | 7/1991 | Lai et al. |
| 5,070,215 A | 12/1991 | Bambury et al. |
| 5,135,297 A | 8/1992 | Valint |
| 5,177,165 A | 1/1993 | Valint et al. |
| 5,177,168 A | 1/1993 | Baron et al. |
| 5,219,965 A | 6/1993 | Valint et al. |
| 5,260,000 A | 11/1993 | Nandu et al. |
| 5,271,875 A | 12/1993 | Appleton et al. |
| 5,310,779 A | 5/1994 | Lai |
| 5,321,108 A | 6/1994 | Kunzler et al. |
| 5,326,584 A | 7/1994 | Kamel et al. |
| 5,336,797 A | 8/1994 | McGee et al. |
| 5,346,976 A | 9/1994 | Ellis et al. |
| 5,358,995 A | 10/1994 | Lai et al. |
| 5,364,918 A | 11/1994 | Valint et al. |
| 5,387,662 A | 2/1995 | Kunzler et al. |
| 5,449,729 A | 9/1995 | Lai |
| 5,472,436 A | 12/1995 | Fremstad |
| 5,512,205 A | 4/1996 | Lai |
| 5,585,871 A | 12/1996 | Linden |
| 5,610,252 A | 3/1997 | Bambury et al. |
| 5,616,757 A | 4/1997 | Bambury et al. |
| 5,682,210 A | 10/1997 | Weirich |
| 5,708,094 A | 1/1998 | Lai et al. |
| 5,710,302 A | 1/1998 | Kunzler et al. |
| 5,714,557 A | 2/1998 | Kunzler et al. |
| 5,726,733 A | 3/1998 | Lai et al. |
| 5,760,100 A | 6/1998 | Nicholson et al. |
| 5,908,906 A | 6/1999 | Kunzler et al. |
| 5,981,669 A | 11/1999 | Valint et al. |
| 6,087,941 A | 7/2000 | Ferraz |
| 6,131,580 A | 10/2000 | Ratner et al. |
| 6,193,369 B1 | 2/2001 | Valint et al. |
| 6,200,626 B1 | 3/2001 | Grobe et al. |
| 6,213,604 B1 | 4/2001 | Valint et al. |
| 6,312,393 B1 | 11/2001 | Abreu |
| 6,348,507 B1 | 2/2002 | Heiler et al. |
| 6,366,794 B1 | 4/2002 | Moussy et al. |
| 6,423,001 B1 | 7/2002 | Abreu |
| 6,428,839 B1 | 8/2002 | Kunzler et al. |
| 6,431,705 B1 | 8/2002 | Linden |
| 6,440,571 B1 | 8/2002 | Valint et al. |
| 6,450,642 B1 | 9/2002 | Jethmalani et al. |
| 6,532,298 B1 | 3/2003 | Cambier et al. |
| 6,550,915 B1 | 4/2003 | Grobe |
| 6,570,386 B2 | 5/2003 | Goldstein |
| 6,579,235 B1 | 6/2003 | Abita et al. |
| 6,599,559 B1 | 7/2003 | McGee et al. |
| 6,614,408 B1 | 9/2003 | Mann |
| 6,630,243 B2 | 10/2003 | Valint et al. |
| 6,638,563 B2 | 10/2003 | McGee et al. |
| 6,726,322 B2 | 4/2004 | Andino et al. |
| 6,735,328 B1 | 5/2004 | Helbing et al. |
| 6,779,888 B2 | 8/2004 | Marmo |
| 6,804,560 B2 | 10/2004 | Nisch et al. |
| 6,851,805 B2 | 2/2005 | Blum et al. |
| 6,885,818 B2 | 4/2005 | Goldstein |
| 6,939,299 B1 | 9/2005 | Petersen et al. |
| 6,980,842 B2 | 12/2005 | March et al. |
| 7,018,040 B2 | 3/2006 | Blum et al. |
| 7,131,945 B2 | 11/2006 | Fink et al. |
| 7,169,106 B2 | 1/2007 | Fleischman et al. |
| 7,398,119 B2 | 7/2008 | Lambert et al. |
| 7,423,801 B2 | 9/2008 | Kaufman et al. |
| 7,429,465 B2 | 9/2008 | Muller et al. |
| 7,441,892 B2 | 10/2008 | Hsu |
| 7,443,016 B2 | 10/2008 | Tsai et al. |
| 7,450,981 B2 | 11/2008 | Jeon |
| 7,639,845 B2 | 12/2009 | Utsunomiya |
| 7,654,671 B2 | 2/2010 | Glynn |
| 7,699,465 B2 | 4/2010 | Dootjes et al. |
| 7,728,949 B2 | 6/2010 | Clarke et al. |
| 7,751,896 B2 | 7/2010 | Graf et al. |
| 7,799,243 B2 | 9/2010 | Mather et al. |
| 7,809,417 B2 | 10/2010 | Abreu |
| 7,878,650 B2 | 2/2011 | Fritsch et al. |
| 7,885,698 B2 | 2/2011 | Feldman |
| 7,907,931 B2 | 3/2011 | Hartigan et al. |
| 7,926,940 B2 | 4/2011 | Blum et al. |
| 7,931,832 B2 | 4/2011 | Pugh et al. |
| 7,964,390 B2 | 6/2011 | Rozakis et al. |
| 8,080,187 B2 | 12/2011 | Tepedino, Jr. et al. |
| 8,096,654 B2 | 1/2012 | Amirparviz et al. |
| 8,118,752 B2 | 2/2012 | Hetling et al. |
| 8,142,016 B2 | 3/2012 | Legerton et al. |
| 8,224,415 B2 | 7/2012 | Budiman |
| 2002/0193674 A1 | 12/2002 | Fleischman et al. |
| 2003/0179094 A1 | 9/2003 | Abreu |
| 2004/0027536 A1 | 2/2004 | Blum et al. |
| 2004/0116794 A1 | 6/2004 | Fink et al. |
| 2005/0045589 A1 | 3/2005 | Rastogi et al. |
| 2005/0221276 A1 | 10/2005 | Rozakis et al. |
| 2007/0016074 A1 | 1/2007 | Abreu |
| 2007/0030443 A1 | 2/2007 | Chapoy et al. |
| 2007/0121065 A1 | 5/2007 | Cox et al. |
| 2007/0142718 A1* | 6/2007 | Abreu .......................... 600/323 |
| 2007/0188710 A1 | 8/2007 | Hetling et al. |
| 2008/0208335 A1 | 8/2008 | Blum et al. |
| 2008/0218696 A1 | 9/2008 | Mir |
| 2009/0033863 A1 | 2/2009 | Blum et al. |
| 2009/0036761 A1 | 2/2009 | Abreu |
| 2009/0057164 A1 | 3/2009 | Minick et al. |
| 2009/0076367 A1 | 3/2009 | Sit et al. |
| 2009/0118604 A1 | 5/2009 | Phan et al. |
| 2009/0189830 A1 | 7/2009 | Deering et al. |
| 2009/0196460 A1 | 8/2009 | Jakobs et al. |
| 2009/0213459 A1* | 8/2009 | Amirparviz .................. 359/465 |
| 2010/0001926 A1 | 1/2010 | Amirparviz et al. |
| 2010/0013114 A1 | 1/2010 | Bowers et al. |
| 2010/0016704 A1 | 1/2010 | Naber et al. |
| 2010/0028559 A1 | 2/2010 | Yan et al. |
| 2010/0072643 A1 | 3/2010 | Pugh et al. |
| 2010/0109175 A1 | 5/2010 | Pugh et al. |
| 2010/0110372 A1 | 5/2010 | Pugh et al. |
| 2010/0113901 A1 | 5/2010 | Zhang et al. |
| 2010/0133510 A1 | 6/2010 | Kim et al. |
| 2010/0249548 A1 | 9/2010 | Muller |
| 2011/0015512 A1 | 1/2011 | Pan et al. |
| 2011/0028807 A1 | 2/2011 | Abreu |
| 2011/0040161 A1 | 2/2011 | Abreu |
| 2011/0055317 A1 | 3/2011 | Vonog et al. |
| 2011/0063568 A1 | 3/2011 | Meng et al. |
| 2011/0084834 A1 | 4/2011 | Sabeta |
| 2011/0116035 A1 | 5/2011 | Fritsch et al. |
| 2011/0157541 A1 | 6/2011 | Peyman |
| 2011/0157544 A1 | 6/2011 | Pugh et al. |
| 2011/0184271 A1 | 7/2011 | Veciana et al. |
| 2011/0274680 A1 | 11/2011 | Mazed et al. |
| 2011/0286064 A1 | 11/2011 | Burles et al. |
| 2011/0298794 A1 | 12/2011 | Freedman |
| 2012/0026458 A1 | 2/2012 | Qiu et al. |
| 2012/0038881 A1 | 2/2012 | Amirparviz et al. |
| 2012/0041287 A1 | 2/2012 | Goodall et al. |
| 2012/0041552 A1 | 2/2012 | Chuck et al. |
| 2012/0069254 A1 | 3/2012 | Burton |
| 2012/0075168 A1 | 3/2012 | Osterhout et al. |
| 2012/0075574 A1 | 3/2012 | Pugh et al. |
| 2012/0078071 A1 | 3/2012 | Bohm et al. |
| 2012/0088258 A1 | 4/2012 | Bishop et al. |
| 2012/0092612 A1 | 4/2012 | Binder |
| 2012/0109296 A1 | 5/2012 | Fan |
| 2012/0177576 A1 | 7/2012 | Hu |
| 2012/0201755 A1 | 8/2012 | Rozakis et al. |

(56) References Cited

U.S. PATENT DOCUMENTS

| | | | |
|---|---|---|---|
| 2012/0245444 | A1 | 9/2012 | Otis et al. |
| 2012/0259188 | A1 | 10/2012 | Besling |
| 2013/0265507 | A1* | 10/2013 | Ford et al. .................. 349/13 |

FOREIGN PATENT DOCUMENTS

| | | |
|---|---|---|
| EP | 1061874 | 12/2000 |
| EP | 1617757 | 1/2006 |
| EP | 1818008 | 8/2007 |
| EP | 1947501 | 7/2008 |
| EP | 2457122 | 5/2012 |
| WO | 9504609 | 2/1995 |
| WO | 0116641 | 3/2001 |
| WO | 0134312 | 5/2001 |
| WO | 03065876 | 8/2003 |
| WO | 2004060431 | 7/2004 |
| WO | 2004064629 | 8/2004 |
| WO | 2006015315 | 2/2006 |
| WO | 2009094643 | 7/2009 |
| WO | 2010105728 | 9/2010 |
| WO | 2010133317 | 11/2010 |
| WO | 2011/011344 | 1/2011 |
| WO | 2011034592 | 3/2011 |
| WO | 2011035228 | 3/2011 |
| WO | 2011035262 | 3/2011 |
| WO | 2011083105 | 7/2011 |
| WO | 2011163080 | 12/2011 |
| WO | 2012035429 | 3/2012 |
| WO | 2012037455 | 3/2012 |
| WO | 2012051167 | 4/2012 |
| WO | 2012051223 | 4/2012 |
| WO | 2012052765 | 4/2012 |

OTHER PUBLICATIONS

Carlson et al., "A 20 mV Input Boost Converter With Efficient Digital Control for Thermoelectric Energy Harvesting," IEEE Journal of Solid-State Circuits, Apr. 2010, pp. 741-750, vol. 45, No. 4.

Chu et al., "Biomedical soft contact-lens sensor for in situ ocular biomonitoring of tear contents," Biomed Microdevices, 2011, pp. 603-611, vol. 13.

Chu et al., "Soft contact lens biosensor for in situ monitoring of tear glucose as non-invasive blood sugar assessment," Talanta, 2011, pp. 960-965, vol. 83.

Ho et al., "Contact Lens With Integrated Inorganic Semiconductor Devices," MEMS 2008. IEEE 21st International Conference on. IEEE, 2008., pp. 403-406.

Lähdesmäki et al., "Possibilities for Continuous Glucose Monitoring by a Functional Contact Lens," IEEE Instrumentation & Measurement Magazine, Jun. 2010, pp. 14-17.

Lingley et al., "A contact lens with integrated micro solar cells," Microsyst Technol, 2012, pp. 453-458, vol. 18.

Parviz, Babak A., "For Your Eyes Only," IEEE Spectrum, Sep. 2009, pp. 36-41.

Saeedi, E. et al., "Self-assembled crystalline semiconductor optoelectronics on glass and plastic," J. Micromech. Microeng., 2008, pp. 1-7, vol. 18.

Saeedi et al., "Self-Assembled Inorganic Micro-Display on Plastic," Micro Electro Mechanical Systems, 2007. MEMS. IEEE 20th International Conference on. IEEE, 2007., pp. 755-758.

Sensimed Triggerfish, Sensimed Brochure, 2010, 10 pages.

Shih, Yi-Chun et al., "An Inductorless DC-DC Converter for Energy Harvesting With a 1.2-µW Bandgap-Referenced Output Controller," IEEE Transactions on Circuits and Systems—II: Express Briefs, Dec. 2011, pp. 832-836, vol. 58, No. 12.

Shum et al., "Functional modular contact lens," Proc. of SPIE, 2009, pp. 73970K-1 to 73970K-8, vol. 7397.

Stauth et al., "Self-assembled single-crystal silicon circuits on plastic," PNAS, Sep. 19, 2006, pp. 13922-13927, vol. 103, No. 38.

Yao, H. et al., "A contact lens with integrated telecommunication circuit and sensors for wireless and continuous tear glucose monitoring," J. Micromech. Microeng., 2012, pp. 1-10, vol. 22.

Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.

Yao et al., "A contact lens with embedded sensor for monitoring tear glucose level," Biosensors and Bioelectronics, 2011, pp. 3290-3296, vol. 26.

Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.

Yeager et al., "A 9 µA, Addressable Gen2 Sensor Tag for Biosignal Acquistion," IEEE Journal of Solid-State Circuits, Oct. 2010, pp. 2198-2209, vol. 45, No. 10.

Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

Wall, K., "Active contact lens that lets you see like the Terminator patented," Feb. 10, 2012, http://www.patexia.com/feed/active-contact-lens-that-lets-you-see-like-the-terminator-patented-2407, Last accessed Mar. 28, 2012, 5 pages.

Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.

Bionic contact lens 'To project emails before eyes,' http://www.kurzweilai.net/forums/topic/bionic-contact-lens-to-project-emails-before-eyes, Last accessed Mar. 14, 2012, 2 pages.

Tweedie, et al., "Contact creep compliance of viscoelastic materials via nanoindentation," J. Mater. Res., Jun. 2006, vol. 21, No. 2, pp. 1576-1589, Materials Research Society.

Brahim, et al., "Polypyrrole-hydrogel composites for the construction of clinically important biosensors," 2002, Biosensors & Bioelectronics, vol. 17, pp. 53-59.

Huang, et al., "Wrinkling of Ultrathin Polymer Films," Mater. Res. Soc. Symp. Proc., 2006, vol. 924, 6 pages, Materials Research Society.

Zarbin, et al., "Nanotechnology in ophthalmology," Can J Ophthalmol, 2010, vol. 45, No. 5, pp. 457-476.

Selner, et al., "Novel Contact Lens Electrode Array for Multi-electrode Electroretinography (meERG)," IEEE, 2011, 2 pages.

Liao, et al., "A 3-µW CMOS Glucose Sensor for Wireless Contact-Lens Tear Glucose Monitoring," IEEE Journal of Solid-State Circuits, Jan. 2012, vol. 47, No. 1, pp. 335-344.

Chen, et al., "Microfabricated Implantable Parylene-Based Wireless Passive Intraocular Pressure Sensors," Journal of Microelectromechanical Systems, Dec. 2008, vol. 17, No. 6, pp. 1342-1351.

Thomas, et al., "Functional Contact Lenses for Remote Health Monitoring in Developing Countries," IEEE Global Humanitarian Technology Conference, 2011, pp. 212-217, IEEE Computer Society.

Pandey, et al., "A Fully Integrated RF-Powered Contact Lens With a Single Element Display," IEEE Transactions on Biomedical Circuits and Systems, Dec. 2010, vol. 4, No. 6, pages.

Lingley, et al., "Multipurpose integrated active contact lenses," SPIE, 2009, 2 pages.

Chu, et al., "Soft Contact-lens Sensor for Monitoring Tear Sugar as Novel Wearable Device of Body Sensor Network," http://www.ksi.edu/seke/dms11/DMS/2_Kohji_Mitsubayashi.pdf, Last accessed Jul. 27, 2012, 4 pages.

Liao, et al., "A 3µW Wirelessly Powered CMOS Glucose Sensor for an Active Contact Lens," 2011 IEEE International Solid-State Circuits Conference, Session 2, Feb. 21, 2011, 3 pages.

Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.

Lončar, et al., "Design and Fabrication of Silicon Photonic Crystal Optical Waveguides," Journal of Lightwave Technology, Oct. 2000, vol. 18, No. 10, pp. 1402-1411.

Liu, et al., "Miniature Amperometric Self-Powered Continuous Glucose Sensor with Linear Response," Analytical Chemistry, 7 pages, Apr. 3, 2012.

Baxter, "Capacitive Sensors," 2000, 17 pages.

(56) References Cited

OTHER PUBLICATIONS

Lingley, et al., "A Single-Pixel Wireless Contact Lens Display," Journal of Micromechanics and Microengineering, 2011, 9 pages.
"Polyvinylidene fluoride," Wikipedia, http://en.wikipedia.org/wiki/Polyvinylidene_fluoride, Last accessed Mar. 30, 2012, 4 pages.
Murdan, "Electro-responsive drug delivery from hydrogels," Journal of Controlled Release, 2003, vol. 92, pp. 1-17.
Haders, "New Controlled Release Technologies Broaden Opportunities for Ophthalmic Therapies," Drug Delivery Technology, Jul./Aug. 2009, vol. 8, No. 7, pp. 48-53.
Singh, et al., "Novel Approaches in Formulation and Drug Delivery using Contact Lenses," Journal of Basic and Clinical Pharmacy, May 2011, vol. 2, Issue 2, pp. 87-101.
"Contact Lenses: Look Into My Eyes," The Economist, Jun. 2, 2011, http://www.economist.com/node/18750624/print, Last accessed Mar. 13, 2012, 8 pages.
Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012, 5 pages.
Unpublished U.S. Appl. No. 13/240,994, Titled "See-Through Display With Infrared Eye-Tracker," filed Sep. 22, 2011, 38 pages.
Unpublished U.S. Appl. No. 13/209,706, Titled "Optical Display System and Method with Gaze Tracking," filed Aug. 15, 2011, 30 pages.
Adler, "What types of statistical analysis do scientists use most often?" O'Reilly Community, Jan. 15, 2010, 2 pages, http://broadcast.oreilly.com/2010/01/what-types-of-statistical-anal.html, Last accessed Sep. 4, 2012.
Bull, "Different Types of Statistical Analysis," Article Click, Feb. 4, 2008, 4 pages, http://www.articleclick.com/Article/Different-Types-Of-Statistical-Analysis/968252, Last accessed Sep. 4, 2012.
"Understanding pH measurement," Sensorland, 8 pages, http://www.sensorland.com/HowPage037.html, Last accessed Sep. 6, 2012.
"Regression analysis," Wikipedia, 11 pages, http://en.wikipedia.org/wiki/Regression_analysis, Last accessed Sep. 6, 2012.
"Statistics," Wikipedia, 10 pages, http://en.wikipedia.org/wiki/Statistics, Last accessed Sep. 6, 2012.
"Nonlinear regression," Wikipedia, 4 pages, http://en.wikipedia.org/wiki/Nonlinear_regression, Last accessed Sep. 10, 2012.
"Linear regression," Wikipedia, 15 pages, http://en.wikipedia.org/wiki/Linear_regression, Last accessed Sep. 10, 2012.
"Integrated circuit," Wikipedia, 9 pages, http://en.wikipedia.org/wiki/Integrated_circuit, Last accessed Sep. 10, 2012.
"Photolithography," Wikipedia, 8 pages, http://en.wikipedia.org/wiki/Photolithography, Last accessed Sep. 10, 2012.
"Alcohol Detection Technologies: Present and Future," American Beverage Institute, 9 pages, 2013.
Harding, et al., "Alcohol Toxicology for Prosecutors: Targeting Hardcore Impaired Drivers," American Prosecutors Research Institute, Jul. 2003, 40 pages.
Kim, et al., "Oral Alcohol Administration Disturbs Tear Film and Ocular Surface," American Academy of Ophthalmology, 2012, 7 pages.
Quick, "Color-changing electrochromic lens technology has fashion and military applications," Gizmag, Jul. 12, 2011, http://www.gizmag.com/electrochromic-lens-technology/19191/, Last accessed Apr. 12, 2012, 4 pages.
Chu, "Contact Lenses that Respond to Light," Technology Review, Nov. 10, 2009, http://www.technologyreview.com/printer_friendly_article.aspx?id=23922, Last accessed Apr. 12, 2012, 2 pages.

\* cited by examiner

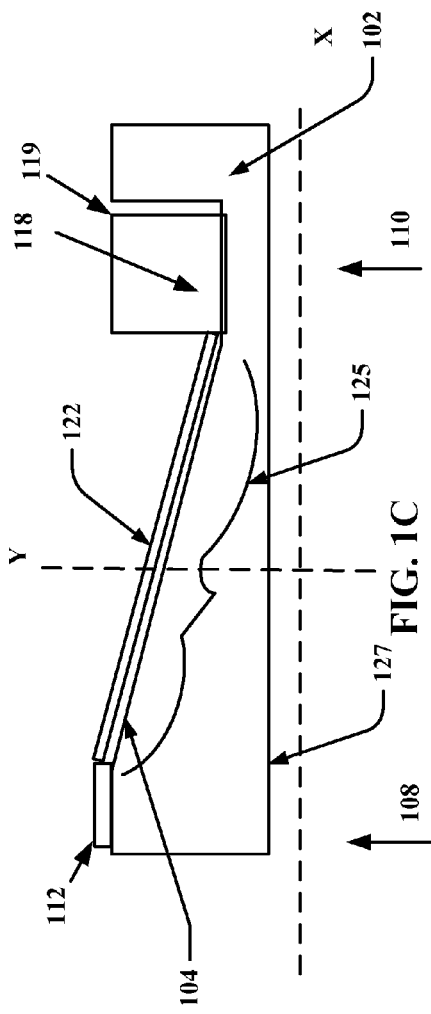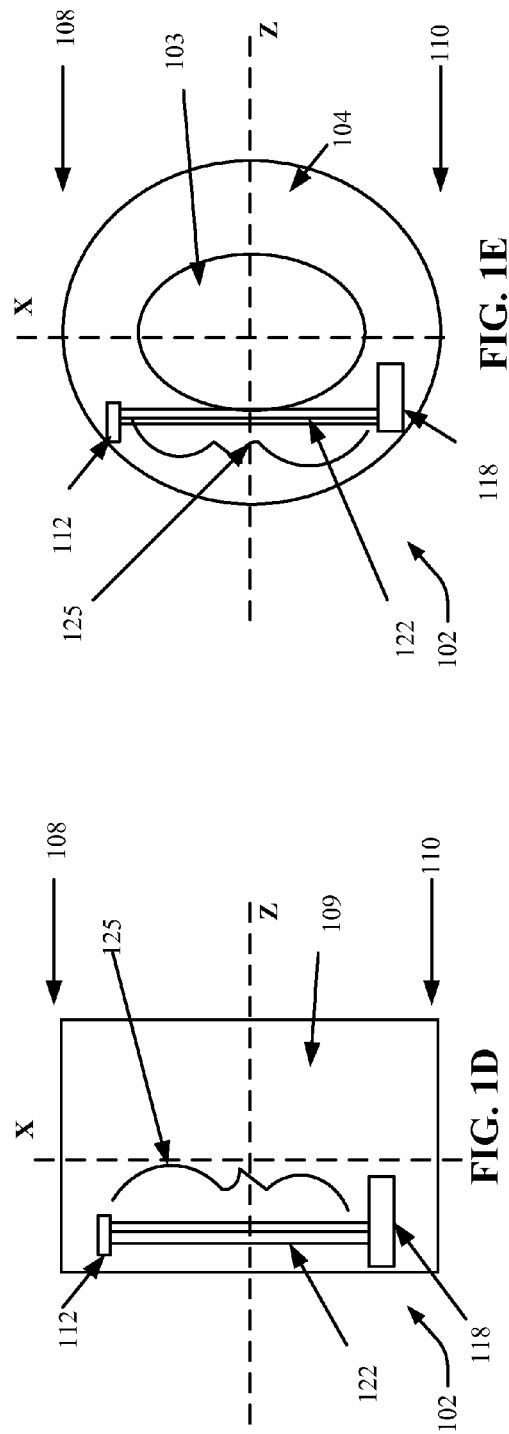

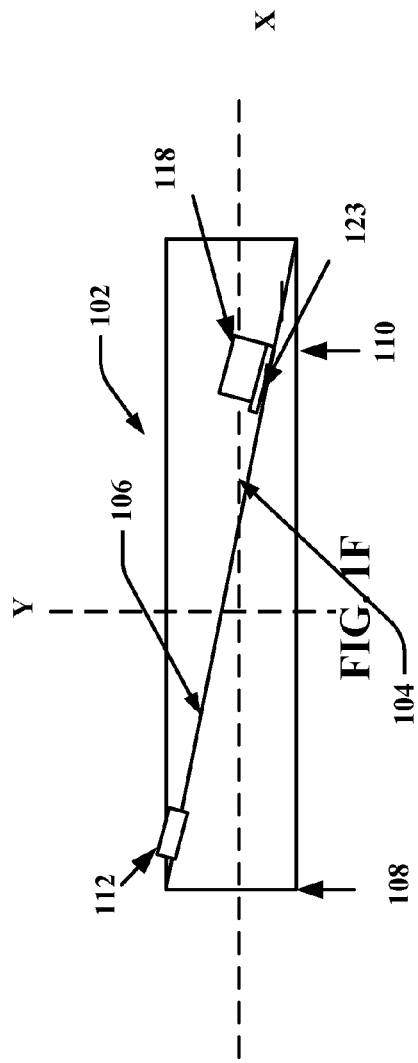
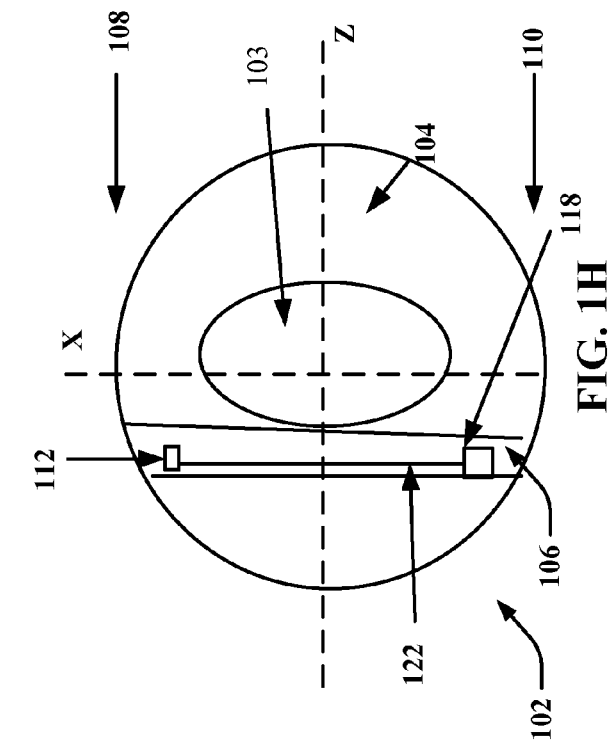
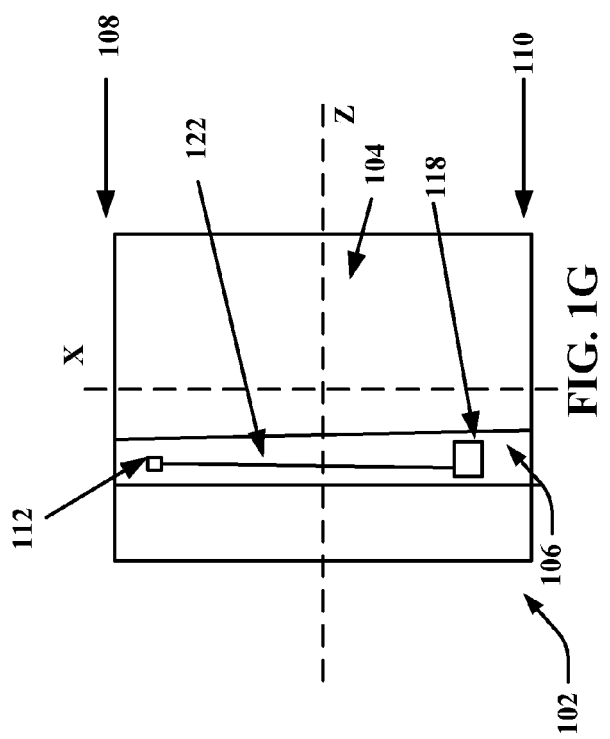
FIG. 1F
FIG. 1H
FIG. 1G

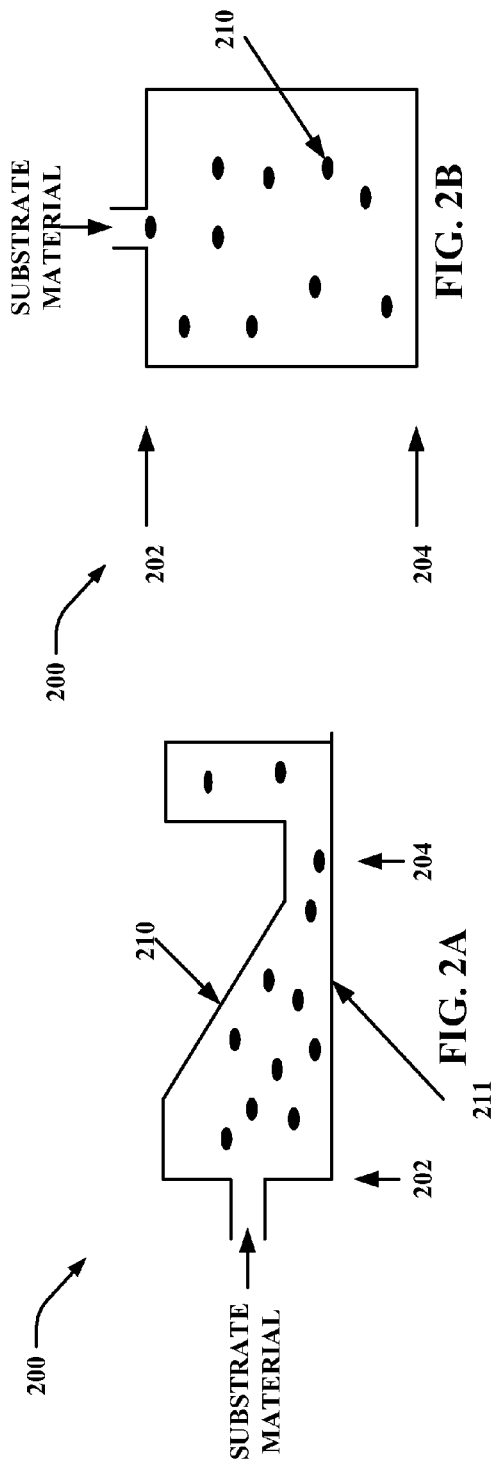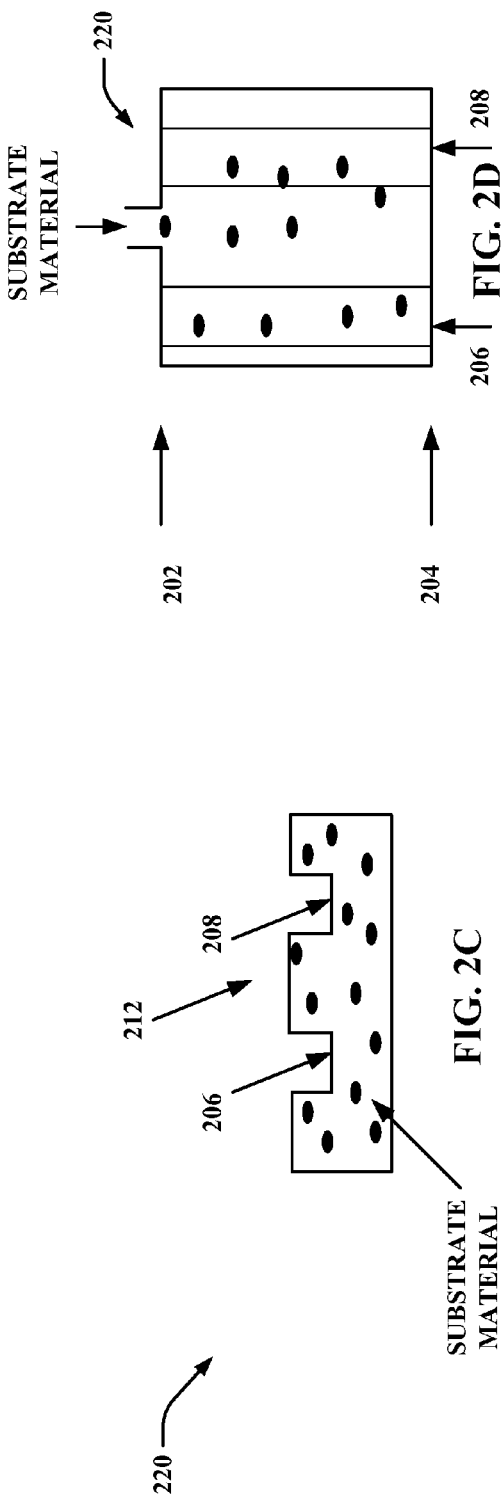

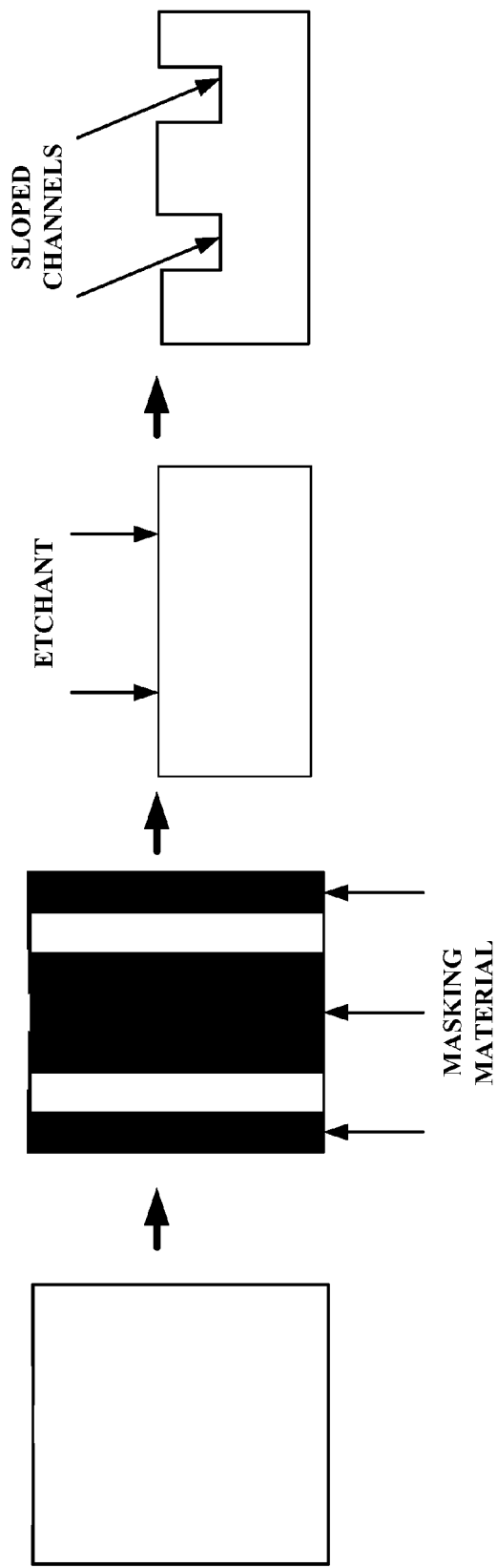

CONTACT LENS HAVING AN UNEVEN EMBEDDED SUBSTRATE AND METHOD OF MANUFACTURE

TECHNICAL FIELD

This disclosure generally relates to a contact lens having an uneven embedded substrate and a method of manufacturing the contact lens.

BRIEF DESCRIPTION OF THE DRAWINGS

FIG. 1C is an illustration of a side view of an exemplary non-limiting uneven substrate having a sloped surface in accordance with aspects described herein.

FIGS. 1D and 1E are illustrations of diagrams of top views of exemplary non-limiting uneven substrates having a sloped surface in accordance with aspects described herein.

FIG. 1F is an illustration of a cross-sectional view of an exemplary non-limiting uneven substrate having a sloped surface in accordance with aspects described herein.

FIGS. 1G and 1H are illustrations of diagrams of top views of exemplary non-limiting uneven substrates having a sloped surface in accordance with aspects described herein.

FIGS. 2A and 2B are illustrations of diagrams of side and top views of exemplary non-limiting molds for manufacturing substrates having uneven surfaces in accordance with aspects described herein.

FIGS. 2C and 2D are illustrations of diagrams of side and top views of exemplary non-limiting molds for manufacturing substrates having uneven surfaces in accordance with aspects described herein.

FIGS. 2E, 2F, 2G and 2H are illustrations of exemplary non-limiting steps of a flow diagram for manufacturing a substrate having a sloped surface in accordance with aspects described herein.

DETAILED DESCRIPTION

Figure 1B:
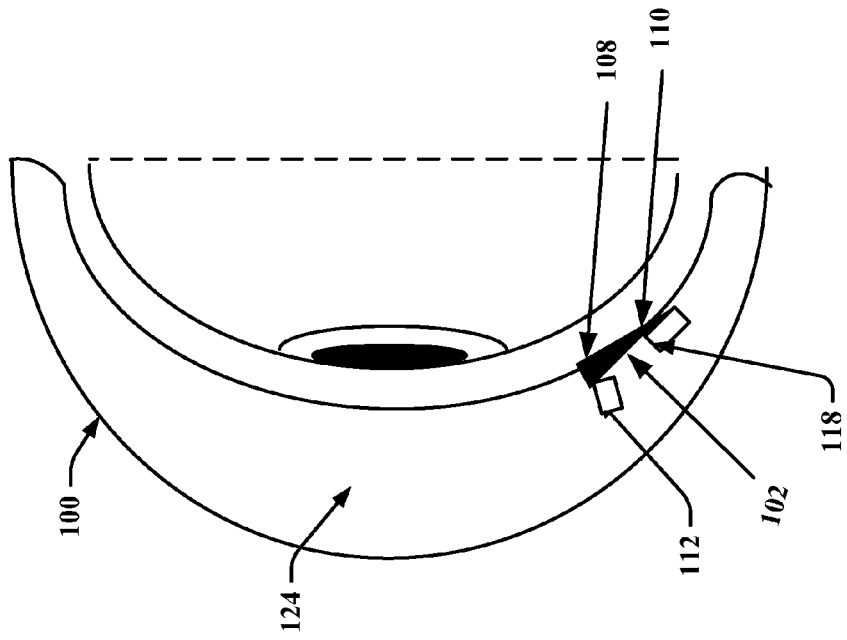
FIGS. 1A and 1B are illustrations of diagrams of top and side views of an exemplary non-limiting contact lens having an uneven embedded substrate in accordance with aspects described herein.

Various aspects are now described with reference to the drawings, wherein like reference numerals are used to refer to like elements throughout. In the following description, for purposes of explanation, numerous specific details are set forth in order to provide a more thorough understanding of one or more aspects. It is evident, however, that such aspects can be practiced without these specific details. In other instances, structures and devices are shown in block diagram form in order to facilitate describing one or more aspects.

Contact lenses are generally crescent-shaped with one portion closer to a top surface having edges that adhere to an eye of a wearer of the contact lens. Modern technology has facilitated processes that enable a sensor, chip and/or other devices (e.g., antenna) to be provided on a substrate embedded in a contact lens. However, the location at which a sensor or chip is encapsulated within a contact lens can dictate the amount of polymer covering the sensor or chip. As such, sensitivity and/or reaction time for an embedded sensor, for example, can differ depending on the location at which the sensor is embedded in the contact lens.

Ability to perform accurate and efficient sensing is an important function of an active contact lens. Analyte, proximity, pressure and/or temperature sensing are examples of types of sensing that can be performed.

With sensors, communication from the contact lens is an important aspect of functionality. To facilitate communication, chips (or, integrated circuits) can be included in the contact lens. Chips are electronic circuits typically fabricated by lithography or the patterned diffusion of trace elements into a substrate of semiconductor material. Additional materials can be deposited and patterned to form interconnections (e.g., metal lines) between devices.

The relative cost and performance of chips makes these devices advantageous over discrete circuits. For example, the cost for chips can be low because chip components can be printed as a single unit by photolithography. Photolithography is a micro-fabrication process used to selectively remove parts of a thin film or bulk of a substrate by employing light to transfer a pattern from a photo mask to a light-sensitive chemical photo resist on the thin film or substrate. A series of chemical treatments then can engrave the exposure pattern into the material underneath the photo resist (or enable deposition of a new material in the desired pattern on the material).

Also, the lower relative cost of chips renders the devices advantageous over discrete circuits because less material is employed in constructing packaging for the chip. Finally, the small size of the chip and close proximity of components can result in high performance because the components can switch quickly and consume minimal amounts of power.

While it is advantageous to include chips in contact lenses, because the chip has a height that is typically greater than the height of the sensor, the amount of polymer above the sensor is generally dictated by the height of the chip. Unfortunately, excess polymer above the sensor can reduce sensitivity of the sensor and/or sensing time, depending on the type of the sensor. To facilitate numerous different types of sensors for contact lenses, the substrate can be angled/uneven/sloped to reduce the amount of polymer above the sensor.

A substrate can be formed into a predetermined uneven surface employing numerous different types of approaches, including injection molding. In injection molding, a material (e.g., plastic, rubber) is heated and injected into a mold. The material hardens in the shape of the mold when the material cools and, in many cases, when pressure is applied to the cooling material.

Molds can be formed from any number of different materials including, but not limited to, steel, aluminum or silicon. Injection molding machines, also known as presses, hold the molds in which components (e.g., substrates) are shaped. Presses are rated by tonnage, which is the amount of clamping force that the injection molding machine can exert.

The molding process involves high pressure injection of the material into a mold that shapes the material into the desired shape. For example, pelletized raw material can be fed through a hopper into a heated barrel. The pellets can be heated to a liquid form, and then cooled (while pressure is applied) to cause the liquid to harden into the shape of the mold.

The clamping force of the press can keep the mold closed during the injection process. The amount of clamping force needed to keep the mold closed can vary depending on projected area of the component being molded. As the area increases, the clamping force needed to keep the mold closed increases. Specifically, the projected area is multiplied by a clamp force of from 2 to 8 tons for each square inch of the projected area. Further, if a material to be molded is fairly rigid, the clamping force must be further increased.

In aspects described herein, a contact lens is fabricated including a substrate having an uneven surface. The uneven surface can be formed by a uniform slope across the substantial entirety of the substrate, by a uniform slope across a portion of the substrate, by one or more sloped regions/channels formed along the substantial entirety of the substrate, and/or by one or more sloped regions/channels across a portion of the substrate. A sensor is formed on a thicker region of the substrate and a chip on the thinner region. As such, the sensor can be positioned closer to the top of the contact lens and thereby have less polymer over such region than the amount of polymer over the region that covers the chip.

In some aspects, as described, a sloped channel need not be formed from one end of the substrate to another end of the substrate, with the sensor at one end of the substrate and the chip at another end of the substrate. Rather, the sloped channel can be provided in a portion of the substrate and the sensor and chip can be in close proximity to one another. In various aspects, for example, a wire can be provided (in the sloped channel) in a configuration of alternating direction (e.g., in a substantial zigzag or sinusoidal pattern) closer to and further from the sloped surface such that the sensor can be effectively provided next to (or in close proximity to) the top of the chip. For example, the chip can be placed on a portion of the wire that is closer to a bottom portion of the substrate and the sensor can be placed on a portion of the same wire that is closer to the sloped surface of the substrate (which can be opposite the bottom portion of the substrate).

In various aspects, a sensor, chip and/or antenna can be provided on the substrate through any number of different approaches. For example, in some aspects, one or more of the sensor, chip and/or antenna can be fabricated employing one or more steps of a micro-fabrication process. For example, in some aspects, the sensor, interconnections/metal lines/wires, and/or antenna can be fabricated. One or more of the sensor, chip and/or antenna can be provided on the substrate employing flip-chip bonding or pick-and-place robotics in various aspects. Near the end of the process, the integrated circuit (e.g., chip) can be assembled at the lowest region (e.g., thinner region or second region) of a sloped channel of the substrate.

The aspects described herein provide contact lenses that include sensors and chips embedded in the contact lens while advantageously maintaining sensitivity and selectivity of the sensor by minimizing the amount of polymer over the sensor.

Various aspects are as follows. In one aspect, a method of manufacturing a contact lens is provided. The method can include: forming a substrate having an uneven surface; providing a first component at a first region of the substrate; providing a second component at a second region of the substrate; and encapsulating the substrate, the first component and the second component in a contact lens polymer.

In another aspect, a contact lens is provided. The contact lens can include: a substrate having a non-uniform surface, wherein the non-uniform surface comprises at least one of: a sloped surface or one or more channels in the substrate, wherein the one or more channels are sloped; a first component at a first region of the substrate; a second component at a second region of the substrate; and a contact lens polymer encapsulating the substrate, the first component and the second component.

In another aspect, a contact lens is provided. The contact lens can include: a substrate having a sloped channel region in a top surface of the substrate; an interconnection patterned in the sloped channel region; a sensor positioned on a first portion of sloped channel region; a chip positioned on a second portion of the sloped channel region, wherein the interconnection is coupled to the sensor at a first end of the interconnection and is coupled to the chip at a second end of the interconnection; and a contact lens polymer encapsulating the substrate, the sensor and the chip.

Figure 1A:
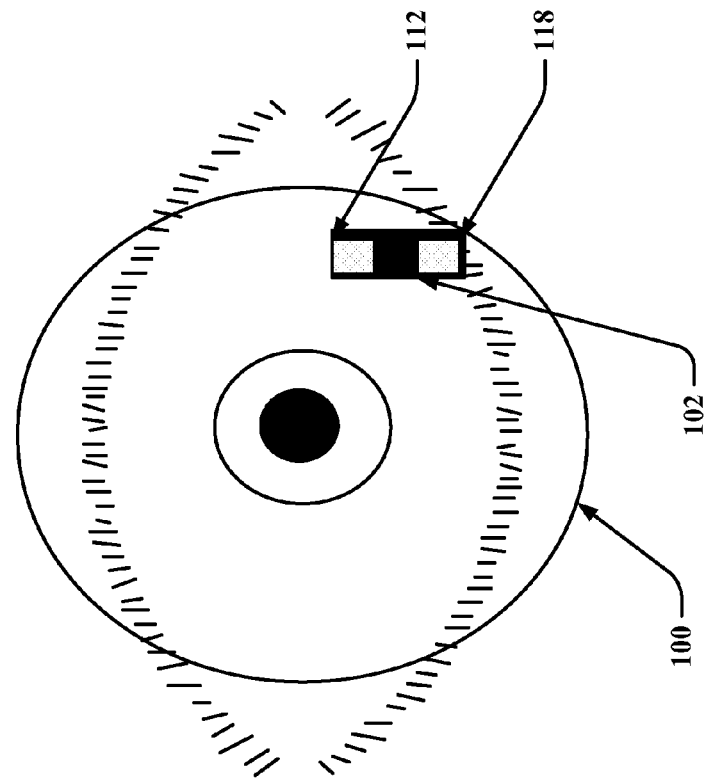

The aspects will be described in greater detail with reference to FIGS. 1A, 1B, 1C, 1D, 1E, 1F, 1G and 1H. As shown in FIGS. 1A, 1B and 1C, contact lens 100 can include a substrate 102 having a non-uniform surface. The non-uniform surface can be a sloped surface 104 in some aspects.

Turning now to FIGS. 1B, 1C and 1F, the sloped surface 104 can be formed in any number of different configurations. As one example, as shown in FIG. 1B, the sloped surface 104 can be angled over the substantial entirety of a top portion of the substrate 102.

As another example, as shown in FIG. 1C, the sloped surface 104 can be angled over a portion of the substrate 102 that corresponds to a channel region 125. An interconnection (e.g., wire 122) can be provided within the channel region 125 and be angled at an angle corresponding to the angle of the channel region 125. As shown, various components (e.g., sensor 112 and chip 118) of the substrate 102 can be provided on substantially flat surfaces that are substantially parallel to the base 127 of the substrate 102. The wire 122 can connect the sensor 112 to the chip 118 in various aspects.

As shown, in some aspects, only the bottom portion of the chip 118 and the channel region 125 are at levels below the level at which the sensor 112 is provided. As shown in FIGS. 1C, 1D and 1E, the channel region 125 can be provided in a sloped configuration, while the remaining portions of the substrate 102 (e.g., the portion of the substrate 102 on which the sensor 112 is provided) can be substantially level with a top edge 119 of the chip 118. As such, as shown in FIG. 1C, in some aspects, the only sloped regions of the substrate 102 are channel regions (e.g., channel region 125).

Although not shown, in various aspects, an antenna (not shown) can be provided on the non-uniform substrate 102. For example, the antenna can be provided on the same plane on which the bottom surface of the sensor 112 is provided and/or on the same plane on which the bottom surface of the chip 118 is provided. In these aspects, an interconnection (e.g., wire 122) can connect the antenna with the sensor and/or chip.

While FIG. 1C illustrates an aspect in which wire 122 is angled uniformly from the chip 118 to the sensor 112, other aspects are possible and envisaged. For example, a wire can be provided in a configuration of alternating direction (e.g., in a substantial zigzag or sinusoidal pattern) closer to and further from the sloped surface (e.g., sloped surface 104) such that the sensor (not shown) can be effectively provided next to (or in close proximity to) the top of the chip (not shown).

As an example, the chip can be placed on a descending portion of the wire (e.g., a portion of the wire that is closer to the base (e.g., base 127) of the substrate), and the sensor can be placed on an ascending portion of the same wire (e.g., a portion of the wire that is closer to a sloped surface (e.g., sloped surface 104) of the substrate). As an example, the ascending portion can be at a height above the base that is greater than the height of the descending portion such that the top surface of the sensor is located at a level that is at least substantially equal to the top surface of the chip.

The two portions of the wire on which the chip and the sensor are placed can be in close proximity to one another (and need not be at respective ends of the substrate, for example). Rather, the two portions of the wire could be in the same region of the substrate. As such, in these aspects, the chip could be in the same region of the substrate as the sensor. In some aspects, the chip can be effectively located next to the sensor on the substrate.

In other aspects, the interconnection need not be a zigzag or sinusoidal pattern. Instead, the interconnection can be uniformly angled and be of short length relative to the length of the entire substrate (or relative to the diameter of the entire substrate in aspects in which the substrate is ring-shaped). For example, the interconnection can have a length of about 1 millimeter.

The interconnection can be angled such that the first end of the interconnection is located at a level with greater height (above the base of the substrate) than the height of the level at which the second end of the interconnection is located. The sensor can be coupled to the first end of the interconnection and the chip can be coupled to the second end of the interconnection. Because the interconnection is of short length, the sensor can be effectively next to the chip.

In some aspects, similar to that shown in FIG. 1C, the sensor and/or the chip can be provided on substantially flat surfaces that are substantially parallel to the base of the substrate.

As another example, as shown in cross-sectional view FIG. 1F, the sloped surface 104 can be provided via one or more sloped channels 106 provided through a substantial entirety of the substrate 102. As shown in FIGS. 1G and 1H, in aspects wherein the non-uniform surface includes one or more sloped channels 106 in the substrate 102, the one or more sloped channels 106 can have a width that is at least equal to a width of the chip 118 so that the chip 118 can be provided in the sloped channel 106 at (or near) the second region 110 of the substrate 102. For example, in some aspects, the width of the chip 118 can be within a range between about 50 and 150 microns. As such, the second region 110 of the substrate 102 can be within a range between about 50 and 150 microns.

Turning back to FIGS. 1C and 1F, in some aspects, the first region 108 of the substrate 102 can have a first thickness and the second region 110 of the substrate 102 can have a second thickness. For example, the first region 108 can have a thickness within a range of about 50 microns to 200 microns. The second region 110 can have a thickness within a range of about 5 microns to 80 microns. In some aspects, the first region 108 can have a thickness of about 150 microns and the second region 110 can have a thickness of about 50 microns.

As shown in FIGS. 1A, 1B, 1C, 1D, 1E, 1F, 1G and 1H, in some aspects, a first component can be provided at the first region 108 of the substrate 102. While the component shown is the sensor 112, in various aspects, other components (e.g., an antenna) can be provided at the first region 108 of the substrate 102.

The sensor 112 can be configured to sense an analyte in a solution (e.g., tear fluid) on the contact lens 100, temperature of the wearer of the contact lens 100 or the like. As noted above, the first region 108 can be of greater height than the height of the second region 110 of the substrate 102.

A second component can be provided at the second region 110 of the substrate 102. While the component shown at the second region 110 is the chip 118, in various aspects, other components (e.g., an antenna) can be provided at the second region 110 of the substrate 102.

In some aspects, the chip 118 can be an integrated circuit manufactured through the lithography process. In various aspects, the chip 118 can be a system-on-a-chip (SoC) in which the components for a computer are included in chip 118 and/or a three-dimensional integrated circuit (3D-IC) having two or more layers of electronic components integrated vertically and/or horizontally into chip 118. In various aspects, the chip 118 can be configured to facilitate communication with the contact lens 100 and/or process one or more outputs from sensor 112.

In some aspects, one or more interconnections 122 can be patterned from the first region 108 of the substrate 102 to the second region 110 of the substrate 102. The interconnections 122 can be metal lines in some aspects. For example, shadow mask evaporation can be employed to pattern the metal lines on the substrate 102.

In some aspects, one or more metal pads (not shown) can be patterned on the substrate 102 proximate to the second region 110 of the substrate 102. Shadow mask evaporation can also be employed to pattern the one or more metal pads. In some aspects, the chip 118 can be provided on one of the one or more metal pads.

As shown in FIGS. 1E and 1H, the substrate 102 can be formed in the shape of a ring in some aspects. The substrate 102 can be formed into a ring shape in a number of different ways. For example, the substrate 102 can be laser cut into the ring shape. In some aspects, a mold having the outline of the ring shape can be placed over the substrate 102 prior to cutting.

As another example, the substrate 102 can be die cut. For example, to cut a ring-shaped substrate, the die can be composed of a cylindrical metal component that can pierce the substrate 102 creating a hole 103 through the center region of the substrate 102.

As another example, the interior of the substrate 102 can be removed through an etching process to form the ring shape. For example, masking can be provided over the region of the substrate 102 that will not be removed from the substrate 102. In some aspects, the areas of the substrate 102 can be masked with metal. The etching material can then be applied to the unmasked portions of the substrate 102 to remove the portion of the substrate 102 that is unmasked. In some embodiments, reactive ion etching (RIE) using plasma can be employed.

Substrate 102 can be curved (not shown) in some aspects. For example, in some aspects, the substrate 102 can be curved into a shape corresponding to the shape of the contact lens 100. For example, the substrate 102 can be cast molded into the curve shape.

As shown in FIG. 1B, a contact lens polymer 124 can encapsulate the substrate 102, sensor 112 and chip 118 in some aspects. Because the height of the second region 110 of the substrate 102 is less than the height of the first region 108, the chip 118 can have a greater amount of contact lens polymer 124 above the chip 118 than the amount of contact lens polymer 124 above the sensor 112.

Although not shown, in various aspects of FIGS. 1A, 1B, 1C, 1D, 1E, 1F, 1G and 1H, an antenna (not shown) can be provided at various locations on the non-uniform surface of the substrate. For example, the antenna can be provided on a plane of the substrate corresponding to the plane on which a sensor is placed, on a plane of the substrate corresponding to the plane on which a chip is placed, and/or in a region of the substrate at which one or more sloped channels are located. In some aspects, the sensor 112, chip 118 and/or antenna can be connected via an interconnection (e.g., wire 122).

Figure 3:
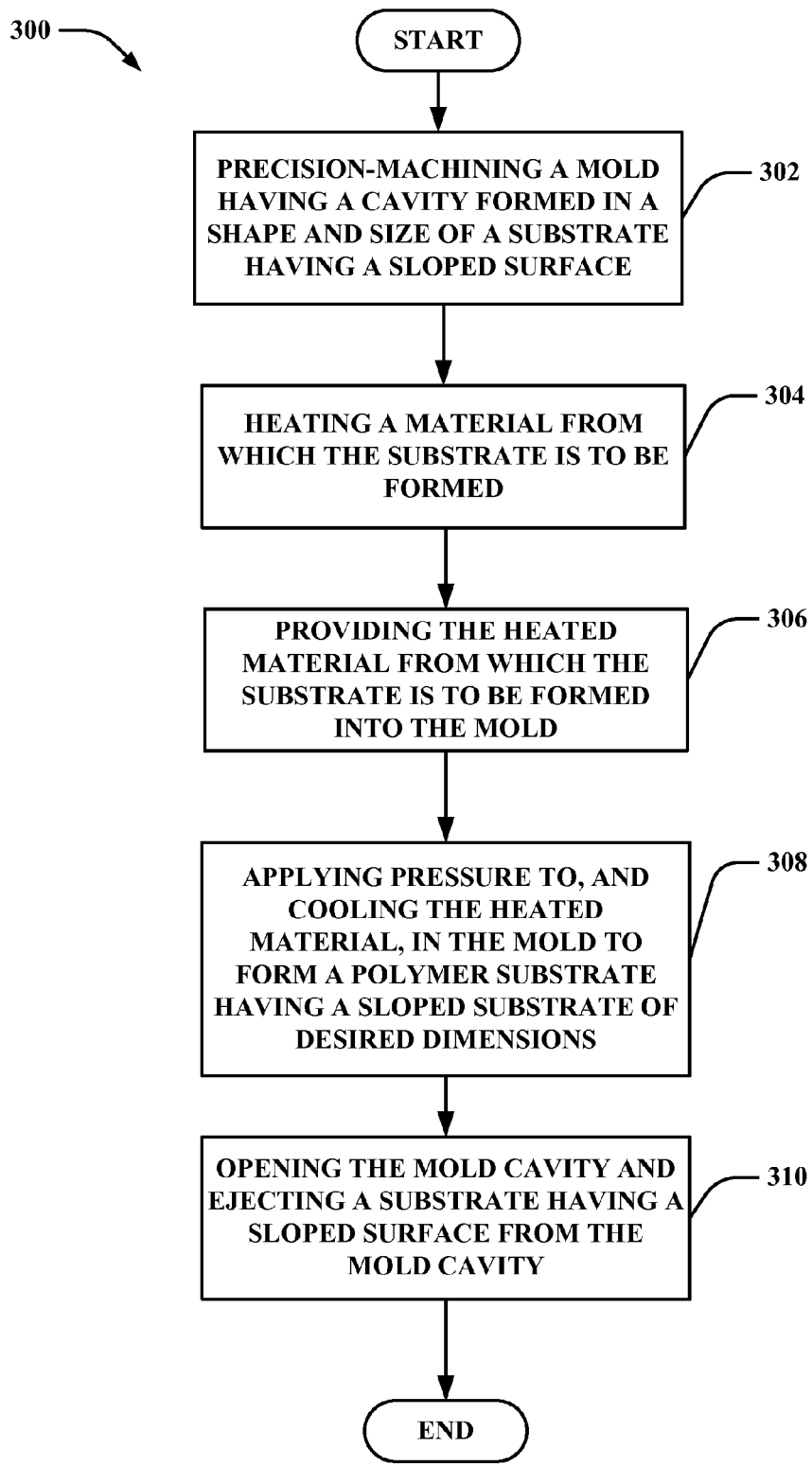
FIGS. 3 and 4 are illustrations of exemplary non-limiting flow charts of methods of manufacturing a substrate having a sloped surface in accordance with aspects described herein.

FIGS. 2A and 2B are illustrations of diagrams of side and top views of an exemplary non-limiting mold for manufacturing substrates having uneven surfaces in accordance with aspects described herein. FIG. 3 is an illustration of an exemplary flow chart of a method of manufacturing a substrate having a sloped surface in accordance with aspects described herein. The method 300 will be described with reference to FIGS. 3, 2A and 2B.

At 302, method 300 can include precision-machining a mold having a cavity formed in a shape and size of a substrate having a sloped surface. For example, in some aspects, the mold can be mold 200 described and shown with reference to FIGS. 2A and 2B.

In various aspects, the mold 200 can be formed from silicon or any number of different materials including, but not limited to, steel and aluminum. For example, silicon can be employed to make a rubber mold while steel and aluminum can be employed to make a metal mold.

The mold 200 can include a cavity having the sloped substrate on a top portion 210 of the cavity, and otherwise being shaped in the desired shape of the substrate. For example, a top portion 210 of the mold 200 can be sloped at an angle at which the substrate is desired to be sloped. In some aspects, the angle of the slope of the mold 200 can be determined based on the desired thickness of the final substrate to be formed in the mold 200.

In one aspect, the first region 202 of the mold 200 can have a thickness of about 150 microns while the second region 204 can have a thickness of about 50 microns (in order to create a substrate having such approximate dimensions). The angle can be dictated by the angle generated when the mold 200 has such proportions. In aspects wherein the mold 200 is formed in a ring shape, the diameter of the sloped surface of the mold 200 can be within a range of 10 to 15 millimeters.

In other aspects, the first region 202 of the mold 200 can have a thickness within a range of about 50 microns to 200 microns and a second region 204 of the mold 200 can have a thickness within a range of about 5 microns to 80 microns. In some aspects, the first region 202 of the mold 200 can have a thickness within a range of about 75 microns to 200 microns and a second region 204 of the mold 200 can have a thickness within a range of about 1 micron to 74 microns.

After precision-machining the mold 200, the following steps 304, 306, 308, 310 can be performed any number of times to generate sloped substrates described herein. At 304, method 300 can include heating a material from which the substrate is to be formed. In various different aspects, the material can be any number of different biocompatible polymers. In various aspects, the material from which the substrate is to be formed can include, but is not limited to, polyethylene terephthalate (PET), parylene, polyimide or silicone.

At 306, method 300 can include providing the heated material from which the substrate is to be formed into the mold 200. In various aspects, the heated material can be provided into the mold through injection molding. For example, the material from which the substrate is to be formed can be poured into an injection unit having the mold 200. The amount of the material provided can be such that the material substantially fills the entirety of the mold 200.

At 308, method 300 can include applying pressure to, and cooling the heated material, in the mold 200 to form a polymer substrate having a sloped surface.

In some aspects, the first region of the substrate can have a thickness within a range of about 50 microns to 200 microns and a second region of the substrate can have a thickness within a range of about 5 microns to 80 microns. In other aspects, the first region of the substrate can have a thickness within a range of about 75 microns to 200 microns and a second region of the substrate can have a thickness within a range of about 1 micron to 74 microns. In some aspects, the first region of the substrate can have a thickness of about 150 microns while the second region can have a thickness of about 50 microns. The angle of the polymer substrate can be dictated then by the angle generated when the substrate has such proportions. The diameter of the sloped surface of the substrate can be within a range of 10 to 15 millimeters (in aspects in which the substrate is formed in a ring shape).

The bottom surface of the substrate can be oval, circular, ring-shaped, rectangular or square, depending on the shape and/or width employed for the mold cavity. In various aspects, any number of different shapes and/or widths can be generated, based on the desired shape and/or width of the substrate within the contact lens.

While the diameter of the sloped surface of the substrate can be within a range of 10 to 15 millimeters, in various aspects, a sloped wire connecting the sensor and the chip can be any number of different lengths (only dictated by the distance between the sensor and the chip). For example, the length of the wire can be about millimeter, about 2 millimeters, about 5 millimeters or the like.

At 310, method 300 can include opening the mold 200 and ejecting a substrate having a sloped surface from the mold 200. In some aspects, the mold cavity can be opened and the substrate can be peeled from the mold 200 to preserve the dimensions and/or shape of the substrate.

Figure 4:
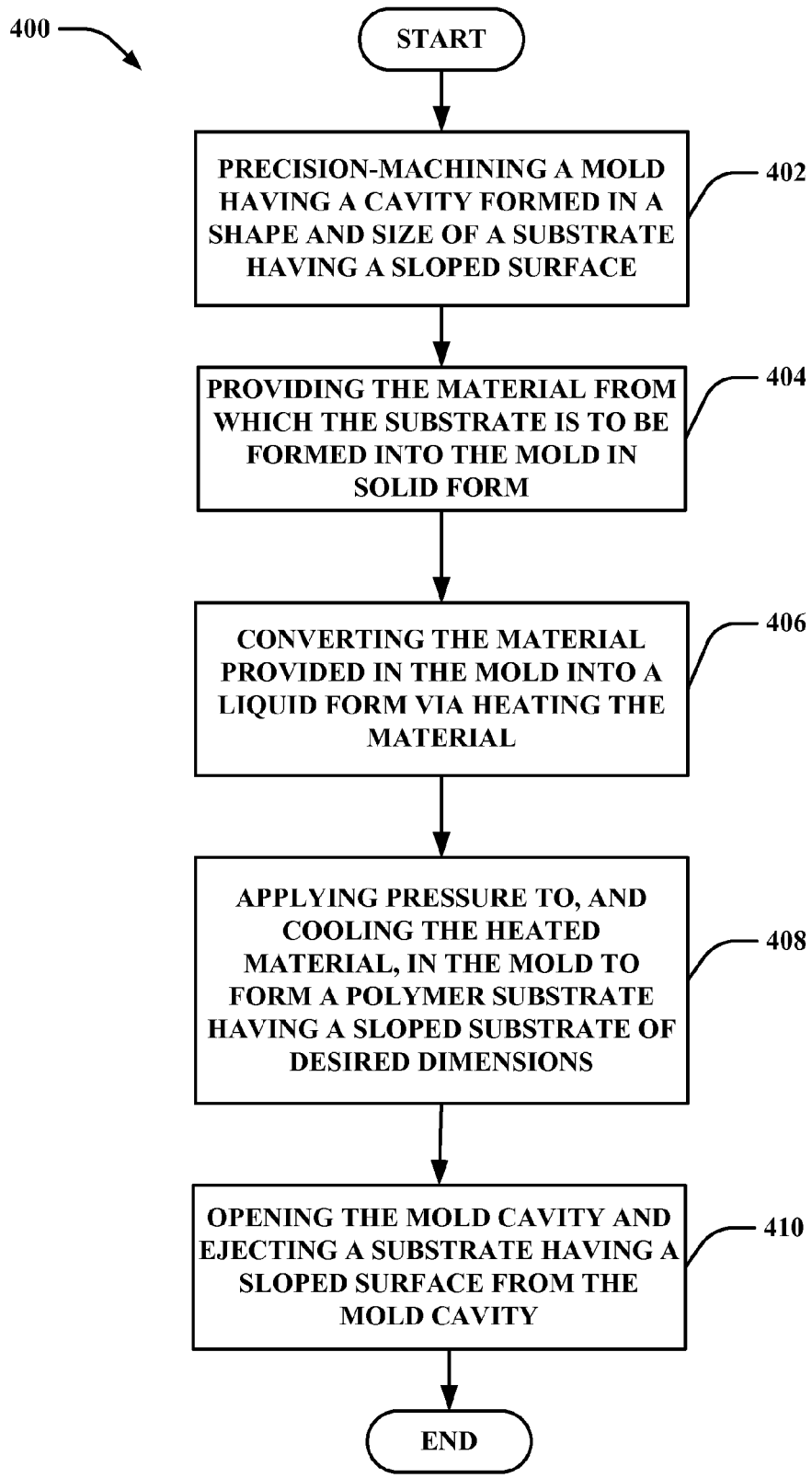

Turning now to FIG. 4, another method of manufacturing a substrate having a sloped surface is shown and described. The method 400 will be described with reference to FIGS. 4, 2A and 2B.

At 402, method 400 can include precision-machining a mold 200 having a cavity formed in a shape and size of a substrate having a sloped surface. In various aspects, the mold 200 can be formed from silicon or any number of different metals including, but not limited to, steel and aluminum. For example, silicon can be employed to make a rubber mold while steel and aluminum can be employed to make a metal mold.

The mold 200 can include a cavity having the sloped substrate on a top portion 210 of the mold 200, and otherwise being shaped in the desired shape of the substrate. For example, a top portion 210 of the mold 200 can be sloped at an angle at which the substrate is desired to be sloped while the base 211 of the mold 200 can be a circular, oval, ring-shaped, square or rectangular shape.

As shown in FIG. 2A, the mold 200 can be shaped in a form corresponding to substrate 102 of FIG. 1C. As such, mold 200 can be employed to form substrate 102 in some aspects.

In some aspects, the angle of the slope can be determined based on the desired thickness of the final substrate to be formed in the mold 200. In one aspect, the first region 202 of the mold 200 can have a thickness of about 150 microns while the second region 204 can have a thickness of about 50 microns (in order to create a substrate having such approximate dimensions). In some aspects, the first region 202 of the mold 200 can have a thickness within a range of about 50 microns to 200 microns and a second region 204 of the mold 200 can have a thickness within a range of about 5 microns to 80 microns. In some aspects, the first region 202 of the mold 200 can have a thickness within a range of about 75 microns to 200 microns and a second region 204 of the mold 200 can have a thickness within a range of about 1 micron to 74 microns.

The angle can be dictated by the angle generated when the mold 200 has such proportions. In aspects wherein the mold 200 is fabricated in a ring shape, the diameter of the sloped surface of the mold 200 can be within a range of 10 to 15 millimeters.

After precision-machining the mold 200, the following steps 404, 406, 408, 410 can be performed any number of times to generate sloped substrates described herein.

Turning first to 404, method 400 can include providing the material from which the substrate is to be formed into the mold 200 in solid form. The material can be in the form of pellets, for example.

In various different aspects, the material can be any number of biocompatible polymers. In some aspects, the material from which the substrate is to be formed can include, but is not limited to, parylene, polyimide or silicone.

As with method 300, injection molding can be employed to introduce the material into the mold 200. As before, the material can be provided into an injection unit having the mold 200.

At 406, method 400 can include converting the material provided in the mold 200 into a liquid form via heating the material. For example, cylinders within the injection unit can heat the material in the mold 200 and cause the material to convert to a liquid state. The number and size of the pellets introduced into the mold 200 can be such that, when heated, the liquid material that results substantially fills the mold 200, thereby reaching a top portion 210 of the mold 200 at which the sloped portion of the mold 200 is located.

At 408, method 400 can include applying pressure to, and cooling the heated material, in the mold 200 to form a polymer substrate having a sloped substrate of desired dimensions. The desired dimensions can be those corresponding to the dimensions with which the mold 200 was formed.

For example, in some aspects, the first region of the substrate can have a thickness of about 150 microns while the second region of the substrate can have a thickness of about 50 microns. In other aspects, the first region of the substrate can have a thickness within a range of about 50 microns to 200 microns and a second region of the substrate can have a thickness within a range of about 5 microns to 80 microns. In some aspects, the first region of the substrate can have a thickness within a range of about 75 microns to 200 microns and a second region of the substrate can have a thickness within a range of about 1 micron to 74 microns.

The angle of the substrate can be dictated by the angle generated when the substrate has such proportions. The bottom surface of the substrate can be circular, oval, ring-shaped, rectangular or square, depending on the shape of the bottom surface of the mold 200. In various aspects, any number of different shapes and/or widths can be generated, based on the desired shape and/or width of the substrate within the contact lens.

The diameter of the sloped surface of the substrate can be within a range of 10 to 15 millimeters (in aspects in which the substrate is formed in a ring shape). While the diameter of the sloped surface of the substrate can be within a range of 10 to 15 millimeters, in various aspects, a sloped wire connecting components on the substrate can be any number of different lengths (only dictated by the distance between the components). For example, the length of the wire can be 1 millimeter, 2 millimeters, 5 millimeters or the like.

At 410, method 400 can include opening the mold 200 and ejecting a substrate having a sloped surface from the mold 200. In some aspects, the mold 200 can be opened and the substrate can be peeled from the mold 200 to preserve the dimensions and/or shape of the substrate.

Figure 5:
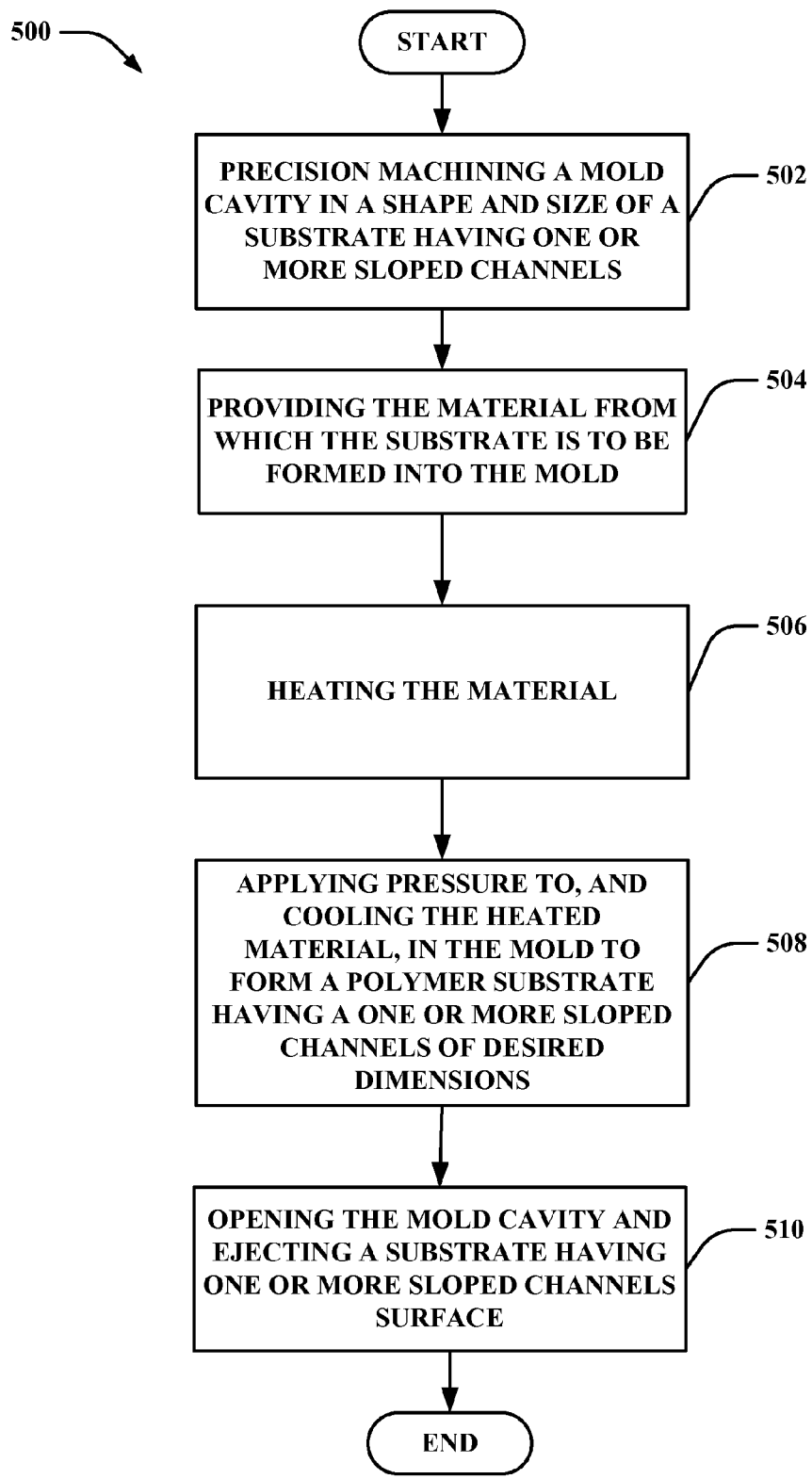
FIGS. 5 and 6 are illustrations of exemplary non-limiting flow charts of methods of manufacturing a substrate having an uneven substrate with a sloped surface in accordance with aspects described herein.
Figure 6:
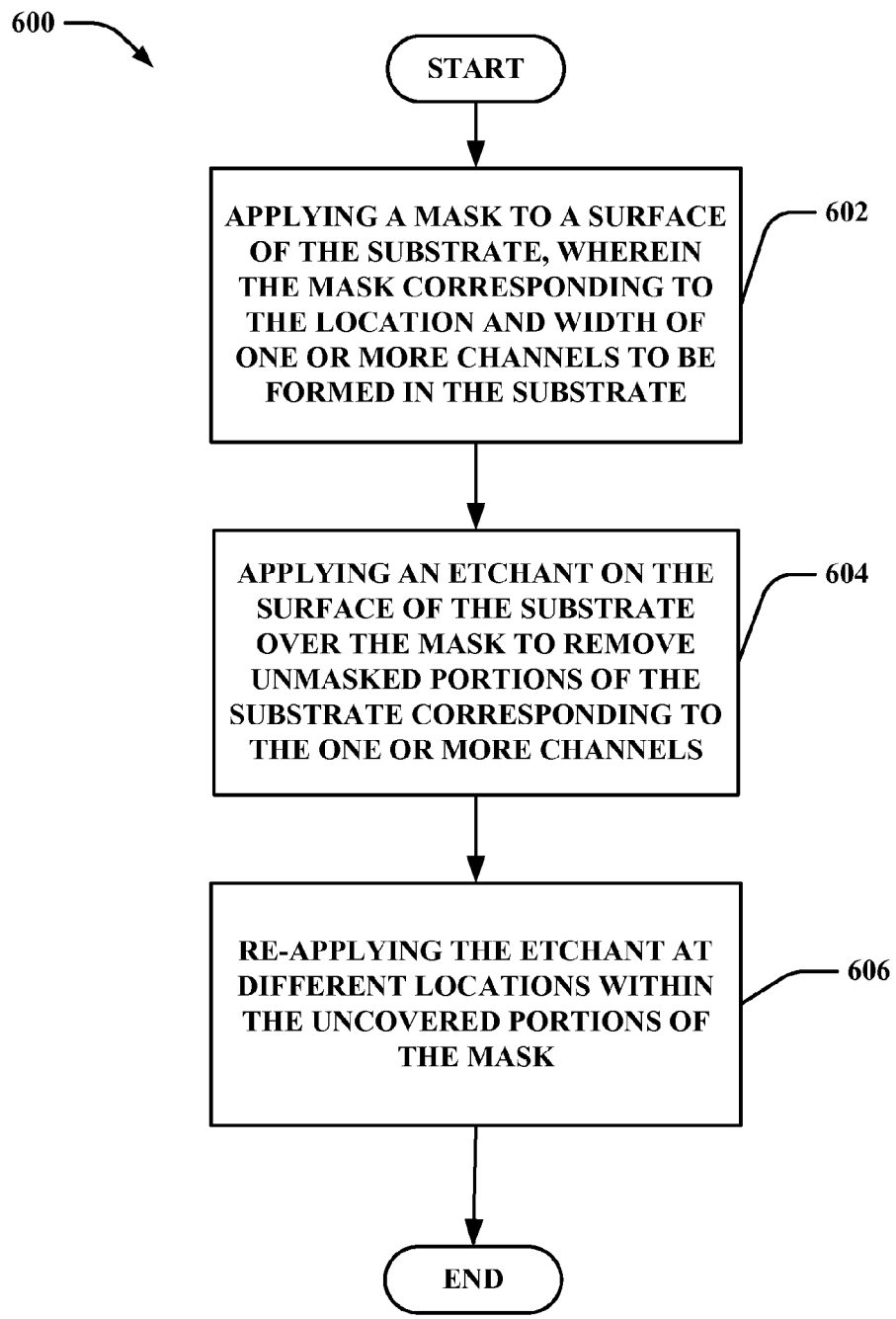

FIGS. 5 and 6 are illustrations of exemplary non-limiting flow charts of methods of manufacturing a substrate having an uneven substrate with a sloped surface in accordance with aspects described herein. In these aspects, the substrate can have one or more sloped channels 206, 208. The method 500 will be described with reference to FIGS. 5, 2C and 2D.

Turning first to FIG. 5, at 502, method 500 can include precision-machining a mold 220 in a shape and size of a substrate having one or more sloped channels 206, 208. In various aspects, the mold 220 can be formed from silicon or any number of different metals including, but not limited to, steel and aluminum. For example, silicon can be employed to make a rubber mold while steel and aluminum can be employed to make a metal mold.

As shown in FIG. 2C, the mold 220 can be formed as a hollow square or rectangular cavity having a desired number of sloped channels 206, 208 formed in the top portion 212 of the mold 220. In other aspects, the mold (not shown) can be formed as a circular, oval or ring-shaped cavity having a desired number of sloped channels formed in the top portion of the mold.

One or more of the sloped channels 206, 208 can be a width suitable for receiving a chip within the sloped channels 206, 208 at or near a second region 204 of the channel 206. As such, in some aspects, the one or more sloped channels 206, 208 are machined to have a first width at a first region 202 of the sloped channel 206 and a second width at a second region 204 of the sloped channel 206 since the chip is to be provided at or near the second region 204 of the substrate formed from the mold 220.

In some aspects, the sloped channel 206 is of substantially uniform width from a first region 202 of the channel 206 to a second region 204 of the channel 206. As described, the width can be suitable for receiving a chip within the channel 206.

In various aspects, the sloped channels 206, 208 can be formed in the substantial entirety of the top portion 212 of the substrate (as shown) or within only one or more portions of the top portion 212 of the substrate. For example, in some aspects, the one or more sloped channels 206, 208 need not be formed from one end of the substrate to another end of the substrate. Rather, the one or more sloped channels 206, 208 can be provided within only a portion of the substrate (e.g., substrate 102 of FIG. 1C).

In some aspects, the one or more sloped channels 206, 208 can be formed in the top portion 212 of the mold 220 through a stamping process. The stamping process can include an application of a stamp on a top portion 212 of the mold 220. For example, the stamp can be formed in the shape, width and desired angle of the sloped channel 206. The stamp can be applied with pressure and, in some aspects, heat can also be applied to cause one or more portions of the mold 220 to deform into one or more respective sloped channels 206, 208.

In various aspects, the sloped channels 206, 208 can be formed concurrently, simultaneously, or one at a time (with one or more different stamps).

In some aspects, a mask (not shown) can be applied to a top portion 212 of the mold 220 to protect portions of the mold 220 that are not to include the one or more sloped channels 206, 208. An etchant can then be applied to the unprotected surface of the top portion 212 of the mold 220 to create the sloped channels 206, 208.

For example, if the mold 220 is made from steel or aluminum, a waxy ground resistant to acid can be provided on the mold 220 at regions at which the sloped channels 206, 208 are not to be formed. An etchant such as acid can then be applied to the metal to etch the channels 206, 208 into the top portion 212 of the mold 220. The etchant can be applied a number of times to different areas along the desired sloped channel 206 to remove different layers of the mold 220. For example, to create the slope, etchant can be applied more often near the second region 204 of the mold 220 than at the first region in order to create a mold 220 having a first region 202 with greater thickness than the second region 204.

As such, the resultant mold 220 can include a cavity having one or more sloped channels 206, 208 on a top portion 212 of the mold 220, and otherwise being shaped in the desired shape of the substrate. For example, each of the channels 206, 208 in the top portion 212 of the mold 220 can be sloped at an angle at which the substrate is desired to be sloped while the base of the mold 220 can be a circular, oval, ring-shaped, square or rectangular shape.

In some aspects, the angle of the slope can be determined based on the desired thickness of the final substrate to be formed in the mold 220. For example, in one aspect, the first region 202 of the mold 220 can have a thickness of about 150 microns while the second region 204 can have a thickness of about 50 microns (in order to create a substrate having such approximate dimensions). In other aspects, the first region 202 of the mold 220 can have a thickness between about 50 microns and 200 microns and a second region 204 of the mold 220 can have a thickness between about 5 microns and 80 microns. The sloped surface of the mold 220 can have a diameter within a range of 10 to 15 millimeters (in aspects in which the mold 220 is ring-shaped).

After precision-machining the mold, the following steps 504, 506, 508, 510 can be performed any number of times to generate the substrates having one or more sloped channels described herein. At 504, method 500 can include providing the material from which the substrate is to be formed into the mold. In various different aspects, the material can be any number of different biocompatible polymers. In some aspects, the material from which the substrate is to be formed can include, but is not limited to, PET, parylene, polyimide or silicone.

In various aspects, the material can be in the form of pellets or liquid. As with methods 300 and 400, injection molding can be employed to introduce the material into the mold 220. The material can be provided into an injection unit having the mold 220.

At 506, method 500 can include heating the material. For example, cylinders within the injection unit can heat the material in the mold 220. The amount of material provided in the mold 220 can be such that, when heated, the liquid material substantially fills the mold 220, thereby reaching a top portion 212 of the mold 220 at which the sloped channels 206, 208 of the mold 220 are located.

At 508, method 500 can include applying pressure to, and cooling the heated material, in the mold 220 to form a polymer substrate having one or more sloped channels 206, 208 of desired dimensions. The desired dimensions can be those corresponding to the dimensions with which the mold 220 was formed.

At 510, method 500 can include opening the mold 220 and ejecting a substrate having one or more sloped channels 206, 208. In some aspects, the mold 220 can be opened and the substrate can be peeled from the mold 220 to preserve the dimensions and/or shape of the substrate.

The method of FIG. 6 will now be described with reference to FIGS. 6, 2E, 2F, 2G and 2H. FIGS. 2E, 2F, 2G and 2H are illustrations of exemplary non-limiting steps of a flow diagram for manufacturing a substrate having a sloped surface in accordance with aspects described herein.

At 602, method 600 can include applying a mask to a surface of the substrate, wherein the mask has openings corresponding to the location and width of one or more channels to be formed in the substrate. For example, as shown in FIGS. 2E and 2F, a planar substrate can be provided with no channels. Masking can be provided over the region of the substrate that will not be removed from the substrate. For example, in aspects in which the sloped channel is provided from one region of the substrate to another region of the substrate, masking can be provided over regions at which the sloped channels will not be formed.

The substrate can be formed of PET, parylene, polyimide or silicone. In some aspects, the first region and the second region of the substrate can have a thickness between about 100 microns to 200 microns. In some aspects, however, the substrate can have a thickness on a first region of the substrate between about 50 microns and 200 microns and have a thickness at a second region between about 5 microns and 80 microns.

At 604, method 600 can include, as shown in FIG. 2G, applying an etchant on the surface of the substrate over the mask to remove unmasked portions of the substrate corresponding to the one or more channels. In some embodiments, RIE using plasma can be employed.

At 606, method 600 can include re-applying the etchant at different locations within the uncovered portions of the mask. As shown in FIG. 2H, the etchant can be applied and/or re-applied to remove different levels of substrate from the surface and achieve a sloped channel with a first region having a first thickness and a second region having a second thickness. For example, near the first region of the substrate, fewer applications of etchant can be provided than the number of applications of etchant that are provided near the second region of the substrate.

One or more of the sloped channels can be a width suitable for receiving a chip within the channel at (at least) a lower, second region of the channel. As such, in some aspects, the one or more sloped channels are fabricated to have a first width at a top portion of the sloped channel and a second width at a bottom portion of the sloped channel since the chip is to be provided at or near the bottom portion (e.g., second region) of the substrate formed from the mold.

In various aspects, the sloped channels can be formed concurrently, simultaneously, or one at a time (with one or more different stamps).

In various aspects, the one or more channels can be formed in the substantial entirety of the top portion of the substrate (as shown) or within only one or more portions of the top portion of the substrate. For example, in some aspects, the one or more channels need not be formed from one end of the substrate to another end of the substrate. Rather, the one or more channels can be provided within only a portion of the substrate.

Figure 7A:
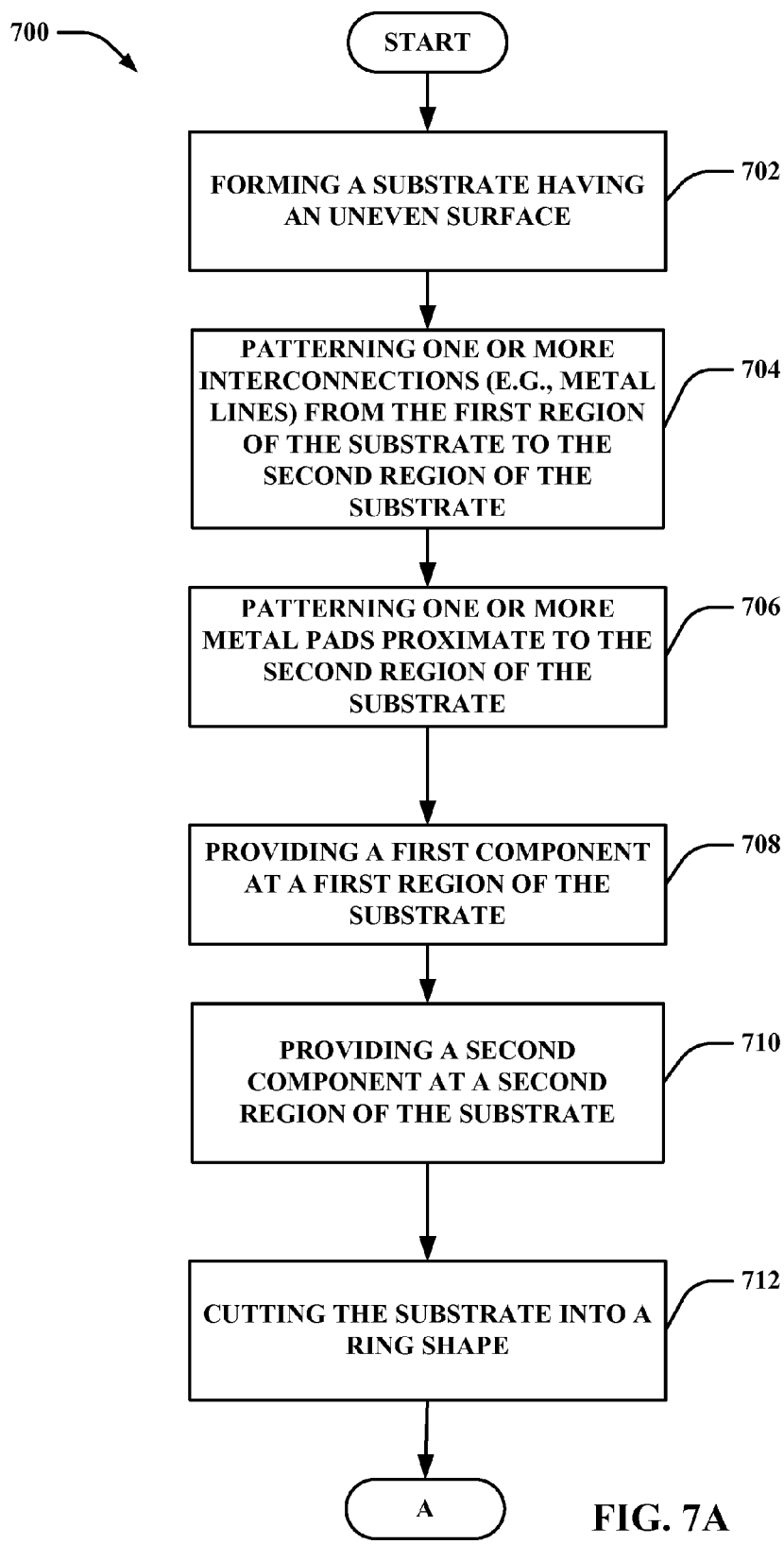
FIGS. 7A and 7B are illustrations of an exemplary flow chart of a method of manufacturing a contact lens having an embedded substrate with an uneven surface in accordance with aspects described herein.
Figure 7B:
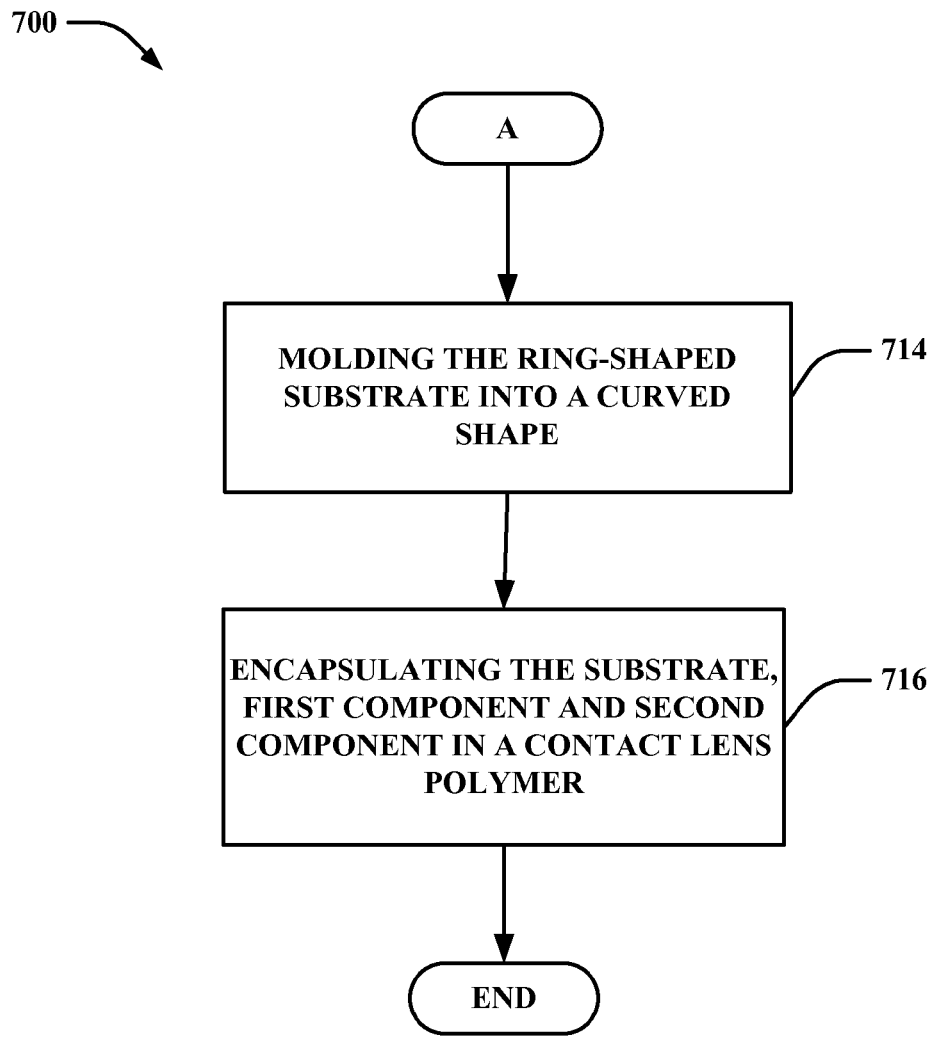

FIGS. 7A and 7B are illustrations of an exemplary flow chart of a method of manufacturing a contact lens having an embedded substrate with an uneven surface in accordance with aspects described herein. Turning first to FIG. 7A, at 702, method 700 can include forming a substrate having an uneven surface. In various aspects, the substrate can be formed according to any one of the different methods 300, 400, 500, 600 described above.

In various aspects, the uneven surface can be sloped from a first region of the substrate to a second region of the substrate. For example, the surface of the substrate can be sloped across the substantial entirety of the surface. As another example, the surface of the substrate can be sloped from one region of the substrate to another region of the substrate. As another example, the surface of the substrate can be sloped from one location of the substrate to another location of the substrate.

One or more sloped channels can be employed to provide the uneven surface in some aspects. In these aspects, the width of at least one of the channels can be great enough to receive a chip and/or to receive one or more metal interconnection lines configured to couple a chip to another component (e.g., to a sensor).

The sloped surface (or sloped channels) of the substrate can be such that the substrate has a first region with a first thickness within a range between about 50 microns and 200 microns and a second region with a second thickness within a range between about 5 microns and 80 microns. In some aspects, the first region has a thickness of about 150 microns and the second region has a thickness of about 50 microns. The sloped surface can have a diameter within a range of about 10 to 15 millimeters (in aspects in which the substrate is formed in a ring shape).

In some aspects, numerous molds can be concurrently or simultaneously employed to mold numerous substrates on a single sheet to manufacture multiple contact lenses at one time. As such, the following steps can be applied to each of the molded substrates that result (for concurrent or simultaneous processing associated with the numerous substrates).

At 704, method 700 can include patterning one or more interconnections (e.g., metal lines) from the first region of the substrate to the second region of the substrate. In some aspects, patterning can be performed by shadow mask evaporation. For example, metal can be evaporated through a shadow mask to pattern metal lines from the first region of the substrate to the second region of the substrate.

At 706, method 700 can include patterning one or more metal pads proximate to the second region of the substrate. Metal pads can also be patterned employing shadow mask evaporation. As with the metal lines, metal can be evaporated through a shadow mask to pattern metal pads.

At 708, method 700 can include providing a first component at a first region of the substrate. In some aspects, the first component can be a sensor configured to sense at least one of temperature level, glucose, potential hydrogen (pH), alcohol, urea, lactate and/or cholesterol level and/or concentration of the wearer of the contact lens.

At 710, method 700 can include providing a second component at a second region of the substrate. In some aspects, the second component can be a chip. The height of the chip can be less than about 1 millimeter and the width of the chip can be within a range between about 50 and 150 microns in some aspects.

In some aspects, the chip can be configured to provide communication between the contact lens and devices external to the contact lens. In some aspects, the chip can include a radio frequency (RF) antenna configured to receive and/or transmit RF signals with RF devices (e.g., RF readers).

At 712, method 700 can include cutting the substrate into a ring shape. The substrate can be cut into a ring shape in a number of different ways. For example, a laser cutter can be employed. In these embodiments, the laser cutter can cut the ring shape of the substrate. In some aspects, a mold having the outline of the ring shape can be placed over the substrate prior to cutting.

As another example, the substrate can be die cut. For example, to cut a ring-shaped substrate, the die can be composed of a cylindrical metal component that can pierce the substrate creating a hole through the center region of the substrate.

As another example, the interior of the substrate can be removed through an etching process to form the ring shape. For example, masking can be provided over the region of the substrate that will not be removed from the substrate. In some aspects, the masked can be metal. The etching material can then be applied to the unmasked portions of the substrate to remove the portion of the substrate that is unmasked. In some embodiments, RIE using plasma can be employed.

Continuing to FIG. 7B, at 714, method 700 can include molding the ring-shaped substrate into a shape of a curve. For example, a mold in a shape of a curve (e.g., a contact lens shape) can be provided. The substrate can be curved via placement of the substrate into a curve-shaped cast mold in some aspects.

At 716, method 700 can include encapsulating the substrate, first component and second component in a contact lens polymer. In some aspects, the contact lens polymer can be hydrogel. For example, the hydrogel can be any suitable biocompatible hydrogel including, but not limited to, siloxane-based hydrogel and/or fluorosiloxane-based hydrogel.

Figure 8:
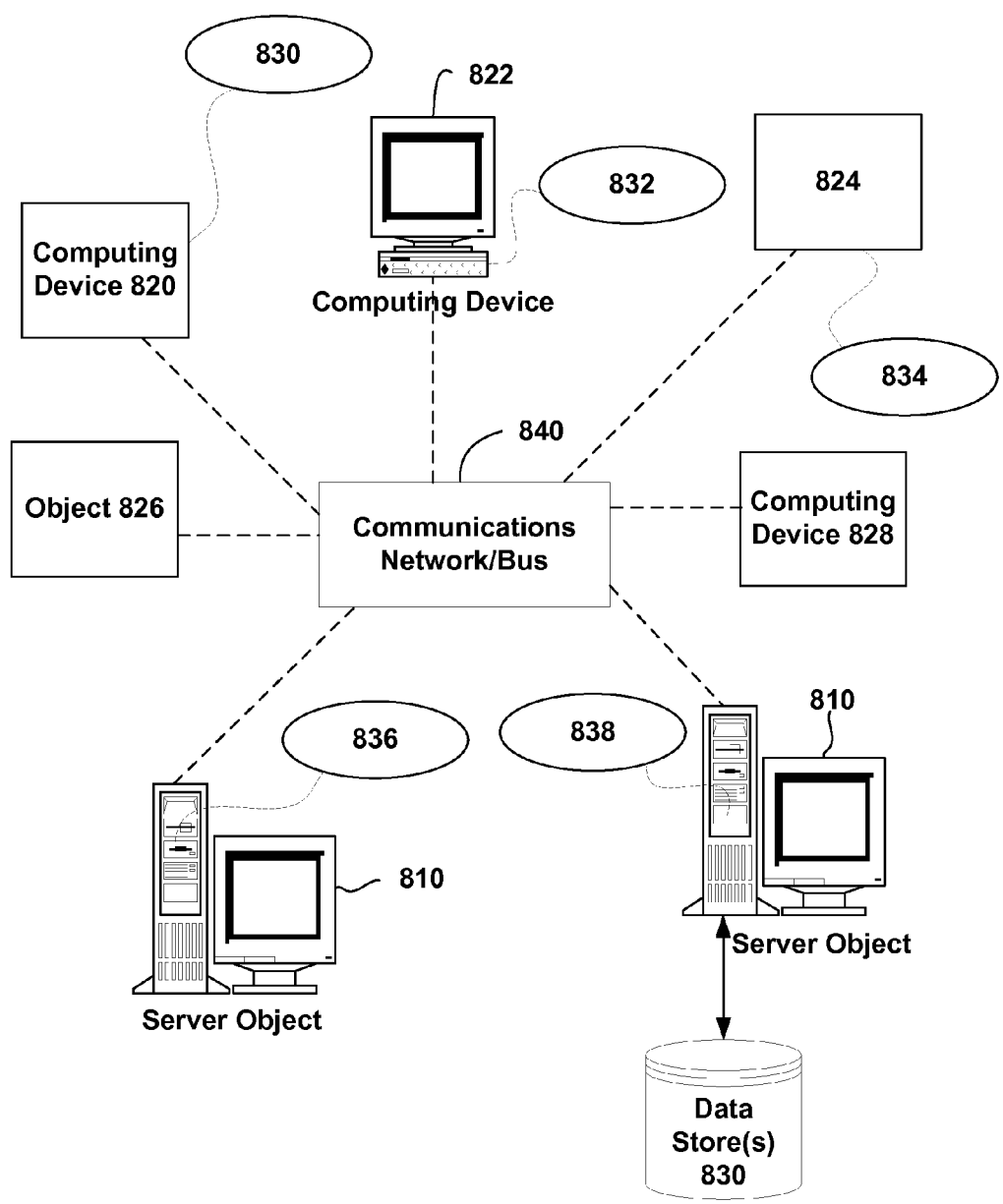
FIG. 8 is an illustration of a schematic diagram of an exemplary networked or distributed computing environment with which one or more aspects described herein can be associated.

Exemplary Networked and Distributed Environments FIG. 8 provides a schematic diagram of an exemplary networked or distributed computing environment with which one or more aspects described in this disclosure can be associated. The distributed computing environment includes computing objects 810, 812, etc. and computing objects or devices 820, 822, 824, 826, 828, etc., which can include programs, methods, data stores, programmable logic, etc., as represented by applications 830, 832, 834, 836, 838. It can be appreciated that computing objects 810, 812, etc. and computing objects or devices 820, 822, 824, 826, 828, etc. can include different devices, such as active contact lenses (and components thereof), personal digital assistants (PDAs), audio/video devices, mobile phones, MPEG-1 Audio Layer 3 (MP3) players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, network 840 can include other computing objects and computing devices that provide services to the system of FIG. 8, and/or can represent multiple interconnected networks, which are not shown.

In a network environment in which the communications network/bus 840 can be the Internet, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP).

Exemplary Computing Device

As mentioned, advantageously, the techniques described in this disclosure can be associated with any suitable device. In various aspects, the data store can include or be included within, any of the memory described herein and/or any of the contact lenses described herein. In various aspects, the data store can be any repository for storing information transmitted to or received from the contact lens.

Figure 9:
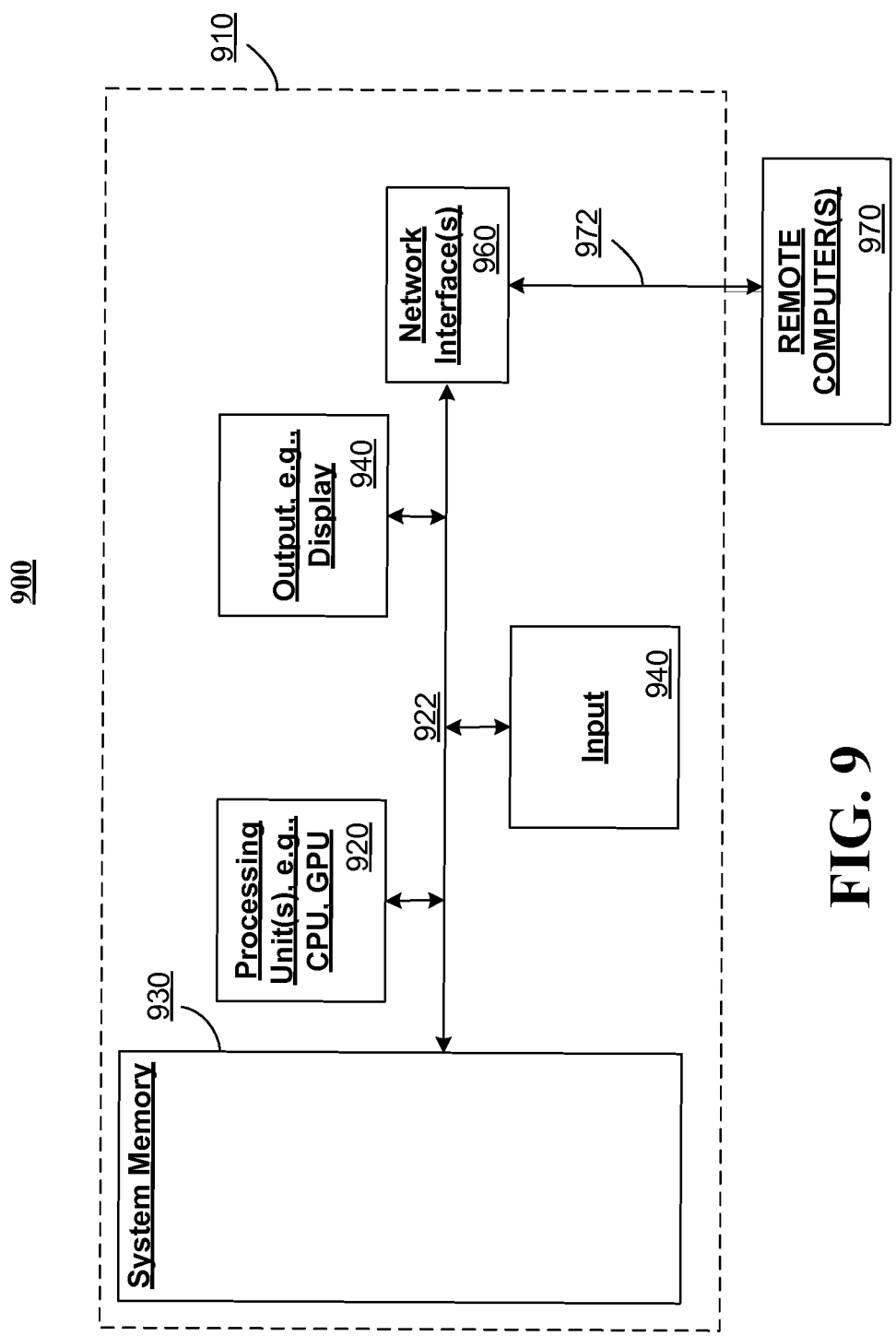
FIG. 9 is an illustration of a schematic diagram of an exemplary computing environment with which one or more aspects described herein can be associated.

FIG. 9 illustrates an example of a suitable computing system environment 900 in which one or aspects of the disclosure can be implemented. Components of computer 910 can include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 can include computer storage media in the form of volatile and/or nonvolatile memory such as read only memory (ROM) and/or random access memory (RAM). By way of example, and not limitation, memory 930 can also include an operating system, application programs, other program components, and program data.

A user can enter commands and information into the computer 910 through input devices 940 (e.g., keyboard, keypad, a pointing device, a mouse, stylus, touchpad, touch screen, motion detector, camera, microphone or any other device that allows the user to interact with the computer 910). A monitor or other type of display device can be also connected to the system bus 922 via an interface, such as output interface 950. In addition to a monitor, computers can also include other peripheral output devices such as speakers and a printer, which can be connected through output interface 950.

The computer 910 can operate in a networked or distributed environment using logical connections to one or more other remote computers, such as remote computer 980. The remote computer 980 can be a personal computer, a server, a router, a network PC, a peer device or other common network node, or any other remote media consumption or transmission device, and can include any or all of the elements described above relative to the computer 910. The logical connections depicted in FIG. 9 include a network 982, such local area network (LAN) or a wide area network (WAN), but can also include other networks/buses e.g., cellular networks.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and non-volatile media, removable and non-removable media. By way of example, and not limitation, computer-readable storage media can be implemented in connection with any method or technology for storage of information such as computer-readable instructions, program components, structured data, or unstructured data. Computer-readable storage media can include, but are not limited to, RAM, ROM, electrically erasable programmable read only memory (EEPROM), flash memory or other memory technology, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium. In various aspects, the computer-readable storage media can be, or be included within, the memory, contact lens (or components thereof) or reader described herein.

On the other hand, communications media typically embody computer-readable instructions, data structures, program components or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals.

It is to be understood that the aspects described in this disclosure can be implemented in hardware, software, firmware, middleware, microcode, or any combination thereof. For a hardware aspect, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

For a software aspect, the techniques described in this disclosure can be implemented with components or components (e.g., procedures, functions, and so on) that perform the functions described in this disclosure. The software codes can be stored in memory units and executed by processors.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The aforementioned systems have been described with respect to interaction between several components. It can be appreciated that such systems and components can include those components or specified sub-components. Sub-components can also be implemented as components communicatively coupled to other components rather than included within parent components (hierarchical). Additionally, it is to be noted that one or more components can be combined into a single component providing aggregate functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flow charts and/or flow diagrams of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks may be required to implement the methodologies described in this disclosure after.

In addition to the various aspects described in this disclosure, it is to be understood that other similar aspects can be used or modifications and additions can be made to the described aspect(s) for performing the same or equivalent function of the corresponding aspect(s) without deviating there from. Still further, multiple processing chips or multiple devices can share the performance of one or more functions described in this disclosure, and similarly, storage can be provided across a plurality of devices. The invention is not to be limited to any single aspect, but rather can be construed in breadth, spirit and scope in accordance with the appended claims.

What is claimed is:

1. A contact lens, comprising:
   a polymer;
   a substrate positioned in the polymer, wherein the substrate comprises a first region having a first thickness and a second region having a second thickness, wherein the first thickness is greater than the second thickness, and wherein the polymer has a non-uniform height above the substrate;
   a sensor positioned on the substrate; and
   a chip positioned on the substrate.

2. The contact lens of claim 1, wherein the first thickness is within a range of about 50 microns to 200 microns and the second thickness is within a range of about 5 microns to 80 microns.

3. The contact lens of claim 1, wherein the sensor is at the first region of the substrate.

4. The contact lens of claim 1, wherein the chip is at the second region of the substrate.

5. The contact lens of claim 1, wherein the sensor is configured to sense an analyte.

6. The contact lens of claim 1, wherein the chip comprises an integrated circuit.

7. The contact lens of claim 1, wherein the polymer encapsulates the substrate, the sensor, and the chip.

8. The contact lens of claim 1, further comprising:
   an antenna positioned on the substrate.

9. The contact lens of claim 1, wherein the substrate is ring-shaped and has a central hole.

10. The contact lens of claim 1, wherein the substrate further comprises a third region between the first and second regions.

11. The contact lens of claim 10, wherein the third region has a sloped configuration.

* * * * *